US012697641B2

(12) United States Patent
Matsubara et al.

(10) Patent No.: US 12,697,641 B2
(45) Date of Patent: Aug. 4, 2026

(54) SEMICONDUCTOR DEVICE AND ULTRASONIC SENSOR

(71) Applicant: ROHM CO., LTD., Kyoto (JP)

(72) Inventors: Hideki Matsubara, Kyoto (JP); Yoshiaki Kono, Kyoto (JP); Ken Hashimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 76 days.

(21) Appl. No.: 18/468,895

(22) Filed: Sep. 18, 2023

(65) Prior Publication Data

US 2024/0001404 A1 Jan. 4, 2024

Related U.S. Application Data

(63) Continuation of application No. PCT/JP2021/046958, filed on Dec. 20, 2021.

(30) Foreign Application Priority Data

Mar. 23, 2021 (JP) ................................ 2021-048763

(51) Int. Cl.
*B06B 1/06* (2006.01)
*B06B 1/02* (2006.01)

(52) U.S. Cl.
CPC .......... *B06B 1/0655* (2013.01); *B06B 1/0215* (2013.01); *B06B 1/023* (2013.01); *B06B 1/0681* (2013.01)

(58) Field of Classification Search
CPC ..... B06B 1/023; B06B 1/0215; B06B 1/0655; B06B 1/0681
See application file for complete search history.

(56) References Cited

U.S. PATENT DOCUMENTS 8,513,855 B2 8/2013 Wu et al.
9,711,706 B2 7/2017 Okaguchi
(Continued)

FOREIGN PATENT DOCUMENTS

CN 108061895 5/2018
CN 109489805 A 3/2019
(Continued)

OTHER PUBLICATIONS

International Search Report and Written Opinion in International Appln. No. PCT/JP2021/046958, mailed on Mar. 1, 2022, 13 pages (with machine translation).
(Continued)

*Primary Examiner* — Minh Q Phan
(74) *Attorney, Agent, or Firm* — Fish & Richardson P.C.

(57) ABSTRACT

A semiconductor device includes a driving circuit arranged to be capable of supplying a drive signal in an ultrasonic band to a piezoelectric element, a damping circuit having a resistance load and an inductive load, and a control circuit arranged to be capable of controlling the driving circuit and performing a reverberation reduction operation after stopping the supply of the drive signal to the piezoelectric element. In the reverberation reduction operation, the control circuit controls the driving circuit to supply the piezoelectric element with a damping signal having a phase different from that of the drive signal, and then enables the damping circuit to connect to the piezoelectric element.

8 Claims, 21 Drawing Sheets

(56) References Cited

U.S. PATENT DOCUMENTS

| | | | |
|---|---|---|---|
| 10,005,105 B2 | 6/2018 | Takahata | |
| 10,165,358 B2 † | 12/2018 | Koudar | |
| 10,511,236 B2 | 12/2019 | Okaguchi | |
| 10,585,178 B2 † | 3/2020 | Koudar | |
| 10,739,453 B2 | 8/2020 | Schmidt et al. | |
| 2011/0260988 A1 | 10/2011 | Colgate et al. | |
| 2016/0173981 A1 | 6/2016 | Koudar et al. | |
| 2016/0284967 A1 | 9/2016 | Kruecken et al. | |
| 2018/0364341 A1 | 12/2018 | Ding et al. | |
| 2019/0079174 A1 | 3/2019 | Kutej et al. | |
| 2019/0141443 A1 | 5/2019 | Koudar et al. | |
| 2020/0072955 A1 | 3/2020 | Haag | |
| 2020/0413188 A1 | 12/2020 | Hustava et al. | |
| 2021/0367133 A1 * | 11/2021 | Xu | H10N 30/802 |

FOREIGN PATENT DOCUMENTS

| | | |
|---|---|---|
| DE | 102010039017 | 9/2017 |
| EP | 2984503 | 8/2018 |
| JP | 2017-122706 | 7/2017 |
| JP | 2018-096752 | 6/2018 |
| RU | 2363550 | 8/2009 |
| WO | WO 2014/097479 A1 | 6/2014 |
| WO | WO 2014/166835 | 10/2014 |

OTHER PUBLICATIONS

Dixon et al., “Active damping of ultrasonic receiving sensors through engineered pressure waves,” Journal of Physics D: Applied Physics, Jan. 20, 2021, 6 pages.

JP OA—Japanese Patent Office, Office Action in Japanese Appln. No. 2023-508626, dated Nov. 11, 2025, 11 pages (with English translation).

JP OA—Japanese Patent Office, Office Action in Japanese Appln. No. 2023-508626, dated Apr. 7, 2026, 8 pages (with English Translation).

CN OA—The State Intellectual Property Office of People’s Republic of China, Office Action in Chinese Appln. No. 202180096011.2, dated May 12, 2026, 15 pages (with English Translation).

* cited by examiner
† cited by third party

SEMICONDUCTOR DEVICE AND ULTRASONIC SENSOR

CROSS-REFERENCE TO RELATED APPLICATIONS

This nonprovisional application is a continuation application of International Patent Application No. PCT/JP2021/046958 filed on Dec. 20, 2021, which claims priority Japanese Patent Application No. 2021-048763 filed on Mar. 23, 2021, the entire contents of which are hereby incorporated by reference.

TECHNICAL FIELD

The present disclosure relates to a semiconductor device and an ultrasonic sensor.

BACKGROUND ART

Ultrasonic sensors having a piezoelectric element are used in various applications. In an ultrasonic sensor, a piezoelectric element is driven to send a transmission wave signal, and a reflected wave signal is received so as to detect distance to an object or to perform proximity detection (see, for example, Patent Document 1).

LIST OF CITATIONS

Patent Literature

Patent Document 1: JP-A-2018-96752

DESCRIPTION OF EMBODIMENTS

Hereinafter, an example of an embodiment of the present disclosure is specifically described with reference to the drawings. In each diagram to be referred to, the same part is denoted by the same numeral or symbol, and overlapping description of the same part is omitted as a rule. Note that in this specification, for simple description, a name of information, a signal, a physical quantity, an element, a part, or the like may be omitted or abbreviated by referring to a symbol or a code thereof. For instance, an adjustment control signal denoted by MV1_CNT described later (see FIG. 3) may be referred to as an adjustment control signal MV1_CNT, or a control signal MV1_CNT in short form, which indicate the same signal.

First, some technical terms used in description of the embodiment of the present disclosure are defined as follows. A line means a wiring for transmitting or applying an electric signal. A ground means a reference conductor having a potential of 0 V (zero volts) to be a reference, or the potential of 0 V itself. The reference conductor is made of a conductor such as a metal. The potential of 0 V may be referred to as a ground potential. In the embodiment of the present disclosure, a voltage without a specific reference means the potential with respect to the ground. A level means the potential level, and for any noted signal or voltage, a high level has the potential higher than that of low level. Any digital signal has a signal level of high level or low level. As for any noted signal or voltage, if the signal or the voltage is at high level, it exactly means that level of the signal or the voltage is high level, while if the signal or the voltage is at low level, it exactly means that level of the signal or the voltage is low level. A level of a signal may be referred to as a signal level, and a level of a voltage may be referred to as a voltage level.

As for any transistor constituted as a field-effect transistor (FET) including a MOSFET, an on state means a state where the transistor is conducting between drain and source, while an off state means a state where the transistor is nonconducting between drain and source (a cut off state). The same is true for other transistors that are not classified in FET. Unless otherwise noted, a MOSFET is understood to be an enhancement type MOSFET. MOSFET is an abbreviation of "metal-oxide-semiconductor field-effect transistor".

Any switch can be constituted of one or more FETs (field-effect transistors). When a switch is on state, the switch is conducting between its terminals. When a switch is at off state, the switch is nonconducting between its terminals. Hereinafter, as for any transistor or switch, on state or off state may be simply referred to as on or off. Connection between any circuit elements, wirings (lines), nodes, or other parts constituting a circuit can be understood to mean electric connection unless otherwise noted.

Figure 1:
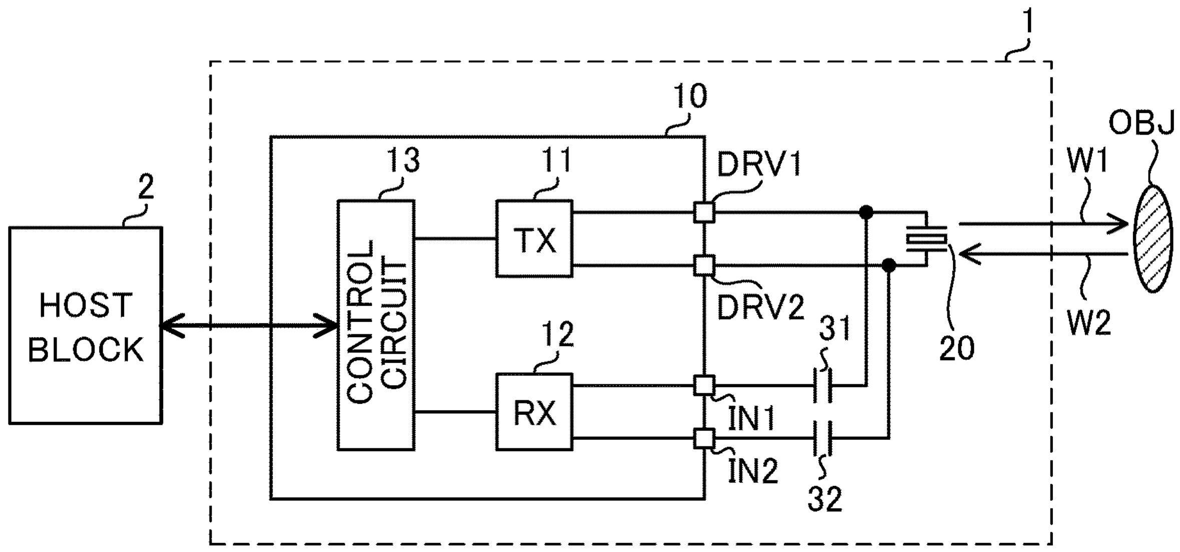
FIG. 1 is an overall structural diagram of an ultrasonic sensor according to an embodiment of the present disclosure.

FIG. 1 illustrates an overall structure of an ultrasonic sensor 1 according to the embodiment of the present disclosure. FIG. 1 also illustrates a host block 2 connected to the ultrasonic sensor 1 and a detection object OBJ existing at a position physically separated from the ultrasonic sensor 1. The ultrasonic sensor 1 includes a semiconductor device 10 constituted of a semiconductor integrated circuit for an ultrasonic sensor, a piezoelectric element 20, and capacitors 31 and 32. FIG. 1 illustrates only a part of the internal structure of the semiconductor device 10.

The ultrasonic sensor 1 transmits an output wave signal W1 in an ultrasonic band to external space of the ultrasonic sensor 1 (in a direction separating from the ultrasonic sensor 1). The output wave signal W1 is reflected by the detection object OBJ, and a reflected wave signal W2 is generated. The reflected wave signal W2 is received by the ultrasonic sensor 1. The ultrasonic sensor 1 detects distance to the detection object OBJ based on the received signal of the reflected wave signal W2, and performs proximity detection of the detection object OBJ or the like. The ultrasonic band is a frequency band higher than that of sounds that human beings can hear, and is a frequency band that human beings cannot hear, which is usually a band above 20 kHz. For instance, the output wave signal W1 has frequencies in a range of 30 to 80 kHz. Each of the output wave signal W1 and the reflected wave signal W2 is the ultrasonic wave signal.

The piezoelectric element 20 has a first terminal and a second terminal. The piezoelectric element 20 generates a mechanical displacement (oscillation) of itself in response to a voltage signal applied between the first terminal and the second terminal, and the mechanical displacement of itself generates the output wave signal W1. Therefore, the piezoelectric element 20 works as a transmitter of the output wave signal W1. In addition, the piezoelectric element 20 has a characteristic of generating an electromotive force between the first terminal and the second terminal in response to a mechanical displacement (oscillation) applied to itself, and also works as a receiver of the reflected wave signal W2.

The semiconductor device 10 uses the piezoelectric element 20 so as to perform a transmission operation of the output wave signal W1 and a reception operation of the reflected wave signal W2. Hereinafter, a combination of the transmission operation of the output wave signal W1 and the reception operation of the reflected wave signal W2 may be referred to as a transmission and reception operation. The semiconductor device 10 includes a transmission circuit 11, a reception circuit 12 and a control circuit 13. The semiconductor device 10 is an electronic component including a semiconductor integrated circuit enclosed in a case (package) made of resin, and circuits constituting the semiconductor device 10 are integrated by semiconductor. The case of the electronic component as the semiconductor device 10 has a plurality of external terminals, which are exposed to outside of the semiconductor device 10 from the case. FIG. 1 illustrates output terminals DRV1 and DRV2 and input terminals IN1 and IN2 as a part of the plurality of external terminals of the semiconductor device 10. Outside the semiconductor device 10, the output terminal DRV1 is connected to the first terminal of the piezoelectric element 20, and the output terminal DRV2 is connected to the second terminal of the piezoelectric element 20. In addition, outside the semiconductor device 10, the input terminal IN1 is connected to the first terminal of the piezoelectric element 20 via the capacitor 31, and the input terminal IN2 is connected to the second terminal of the piezoelectric element 20 via the capacitor 32. Note that the capacitors 31 and 32 may be included in the semiconductor device 10.

The transmission circuit 11 uses the piezoelectric element 20 externally connected between the output terminals DRV1 and DRV2 so as to transmit the output wave signal W1. The reception circuit 12 uses the piezoelectric element 20 externally connected between the input terminals IN1 and IN2 so as to receive an input wave signal in the ultrasonic band. A main input wave signal to be received is the reflected wave signal W2 based on the output wave signal W1. In this way, in this embodiment, the piezoelectric element 20 is commonly connected externally between the output terminals DRV1 and DRV2 and between the input terminals IN1 and IN2, and hence the common piezoelectric element 20, as a transmitter and receiver, is shared by the transmission circuit 11 and the reception circuit 12.

However, as a variation, another piezoelectric element (not shown) different from the piezoelectric element 20 may be externally connected between the input terminals IN1 and IN2 (in this case, the another piezoelectric element is also a structural element of the ultrasonic sensor 1). Alternatively, it may be possible that, when the common piezoelectric element 20 is shared by the transmission circuit 11 and the reception circuit 12, the output terminal DRV1 and the input terminal IN1 are realized by one first input and output terminal, while the output terminal DRV2 and the input terminal IN2 are realized by one second input and output terminal, and the first and second input and output terminals are connected to both the transmission circuit 11 and the reception circuit 12 in parallel (in this case, the capacitors 31 and 32 may be inserted between the reception circuit 12 and the first input and output terminal, and between the reception circuit 12 and the second input and output terminal, respectively). The reception circuit 12 uses the piezoelectric element 20 or the another piezoelectric element described above so as to receive the input wave signal in the ultrasonic band, and performs predetermined reception signal processing on the received signal.

The control circuit 13 controls the transmission circuit 11 and the reception circuit 12. The control circuit 13 controls the transmission circuit 11 to transmit the output wave signal W1 from the piezoelectric element 20. In addition, the control circuit 13 detects distance to the detection object OBJ and performs proximity detection of the detection object OBJ or the like, on the basis of the received signal of the reception circuit 12 (the input wave signal received by the reception circuit 12).

Figure 2:
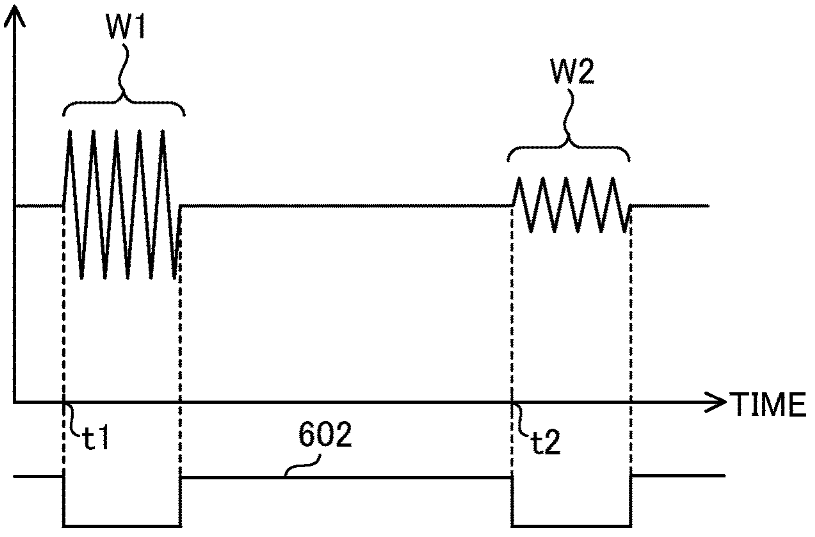
FIG. 2 is a diagram illustrating a relationship between an output wave signal and a reflected wave signal in the ultrasonic sensor, according to the embodiment of the present disclosure.

FIG. 2 is a diagram illustrating the transmission and reception operation by the ultrasonic sensor 1. The control circuit 13 can perform the distance detection process and the proximity detection process. In the distance detection process, the control circuit 13 measures length of time from time point t1 when the output wave signal W1 is transmitted until time point t2 when the reflected wave signal W2 is received (i.e., length between time points t1 and t2), and thus calculates distance between the ultrasonic sensor 1 and the detection object OBJ. Time t1 indicates transmission start time of the output wave signal W1 using the transmission circuit 11 and the piezoelectric element 20, and time point t2 indicates reception start time of the reflected wave signal W2 using the reception circuit 12 and the piezoelectric element 20. In the proximity detection process, the control circuit 13 performs proximity detection of the detection object OBJ on the basis of whether or not the reflected wave signal W2 is received. More specifically, for example, in the proximity detection process, the control circuit 13 determines that the detection object OBJ is close to the ultrasonic sensor 1 (for example, to a vehicle equipped with the ultrasonic sensor 1) if the reflected wave signal W2 is received after the output wave signal W1 is transmitted at time point t1 before a predetermined time elapses, and otherwise the control circuit 13 determines that the detection object OBJ is not close to the ultrasonic sensor 1 (for example, to a vehicle equipped with the ultrasonic sensor 1).

The control circuit 13 is connected to the host block 2 illustrated in FIG. 1 in such a manner that bidirectional communication can be performed. The host block 2 sends a predetermined command to the semiconductor device 10 so that it can issue various instructions to the semiconductor device 10. The semiconductor device 10 performs various operations and processes in accordance with the command from the host block 2. Results of the distance detection process and the proximity detection process are sent from the semiconductor device 10 to the host block 2. The host block 2 is constituted of a microcomputer and the like. If the ultrasonic sensor 1 and the host block 2 are mounted in a vehicle such as an automobile, the host block 2 may be an electronic control unit (ECU). Note that measurement of the length between time points t1 and t2, calculation of distance between the ultrasonic sensor 1 and the detection object OBJ based on the measurement result, and determination whether or not the detection object OBJ is close to the ultrasonic sensor 1 (for example, to the vehicle equipped with the ultrasonic sensor 1) may be performed by the host block 2. In this case, for example, a signal 602 illustrated in FIG. 2, which indicates a time period while the output wave signal W1 is being transmitted and a time period while the reflected wave signal W2 is being received, should be sent from the control circuit 13 to the host block 2.

Figure 3:
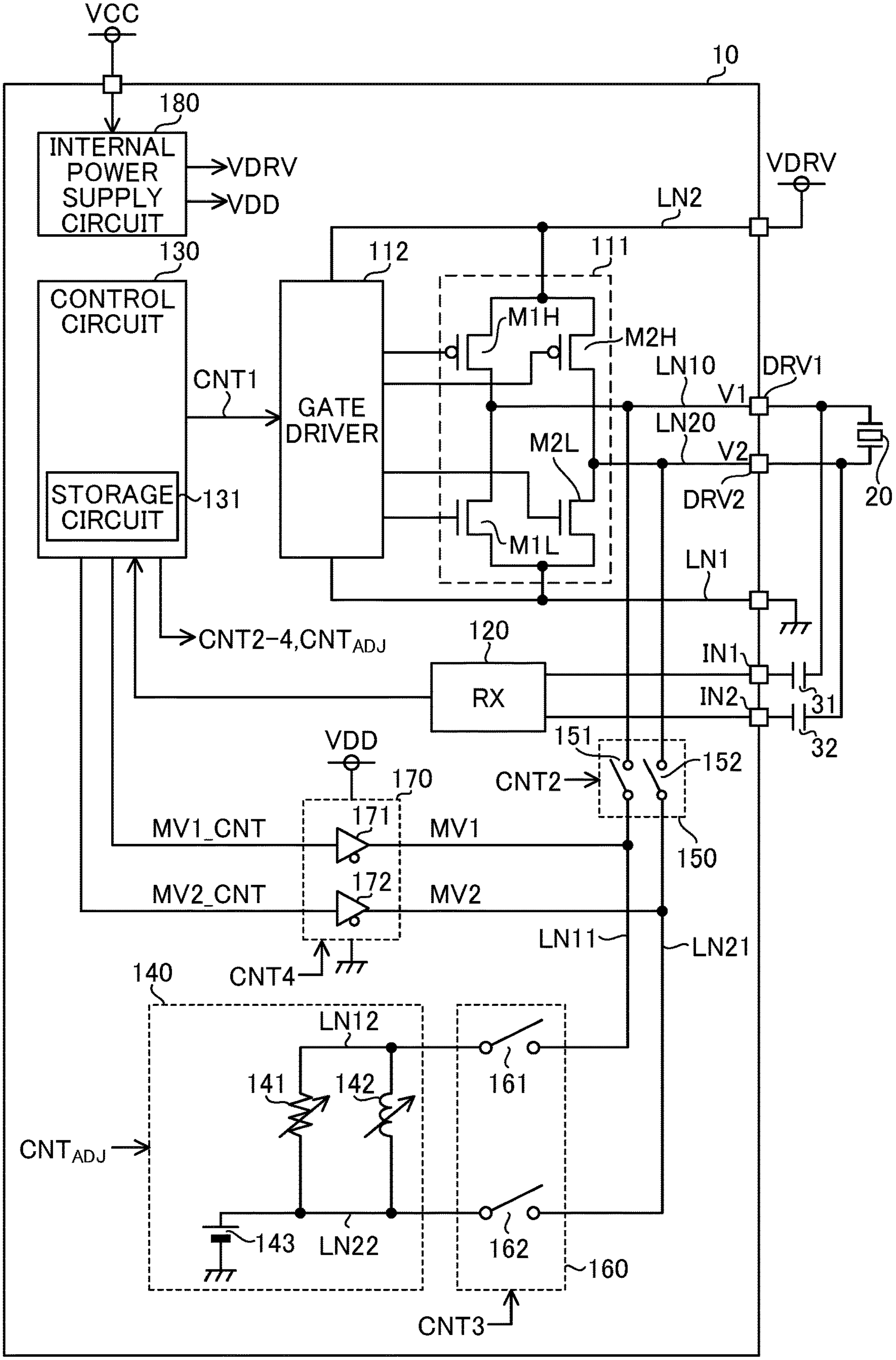
FIG. 3 is a diagram illustrating an internal structure of the semiconductor device constituting the ultrasonic sensor, according to the embodiment of the present disclosure.

FIG. 3 illustrates an internal structure of the semiconductor device 10. The semiconductor device 10 includes a driving circuit 111, a gate driver 112, a reception circuit 120, and a control circuit 130. The driving circuit 111 and the gate driver 112 constitute the transmission circuit 11 of FIG. 1. The reception circuit 120 corresponds to the reception circuit 12 of FIG. 1, and has the function of the reception circuit 12. The control circuit 130 corresponds to the control circuit 13 of FIG. 1, and has the function of the control circuit 13. The semiconductor device 10 further includes a damping circuit 140, switch circuits 150 and 160, and an adjustment driving circuit 170, and an internal power supply circuit 180.

The driving circuit 111 includes four switching elements (switches), i.e. transistors M1H, M1L, M2H and M2L. The transistors M1H and M2H are P-channel type MOSFETs, and the transistors M1L and M2L are N-channel type MOSFETs. The transistors M1H and M1L are connected in series so as to constitute a first half-bridge circuit (first series circuit), while the transistors M2H and M2L are connected in series so as to constitute a second half-bridge circuit (second series circuit). The first and second half-bridge circuits constitute a full-bridge circuit (H-bridge circuit). Sources of the transistors M1H and M2H are connected to a line LN2. The line LN2 is applied with a drive power supply voltage VDRV having a predetermined positive DC voltage value. Drains of the transistors M1H and M1L are commonly connected to a line LN10, and are connected to the output terminal DRV1 via the line LN10. Drains of the transistors M2H and M2L are commonly connected a line LN20, and are connected to the output terminal DRV2 via the line LN20. Sources of the transistors M1L and M2L are connected to a line LN1. The line LN1 is applied with the ground potential. As described above, the output terminal DRV1 and the input terminal IN1 are connected to the first terminal of the piezoelectric element 20 outside the semiconductor device 10, while the output terminal DRV2 and the input terminal IN2 are connected to the second terminal of the piezoelectric element 20 outside the semiconductor device 10 (though the input terminals IN1 and IN2 are connected to the first terminal and the second terminal of the piezoelectric element 20 via the capacitors 31 and 32). In addition, a voltage or signal at the output terminal DRV1 is denoted by V1, and a voltage or signal at the output terminal DRV2 is denoted by V2. Note that the transistors M1H and M2H can be constituted of an N-channel type MOSFET as a variation (in this case, a circuit is added, which generates a voltage higher than the drive power supply voltage VDRV)

Figure 4:
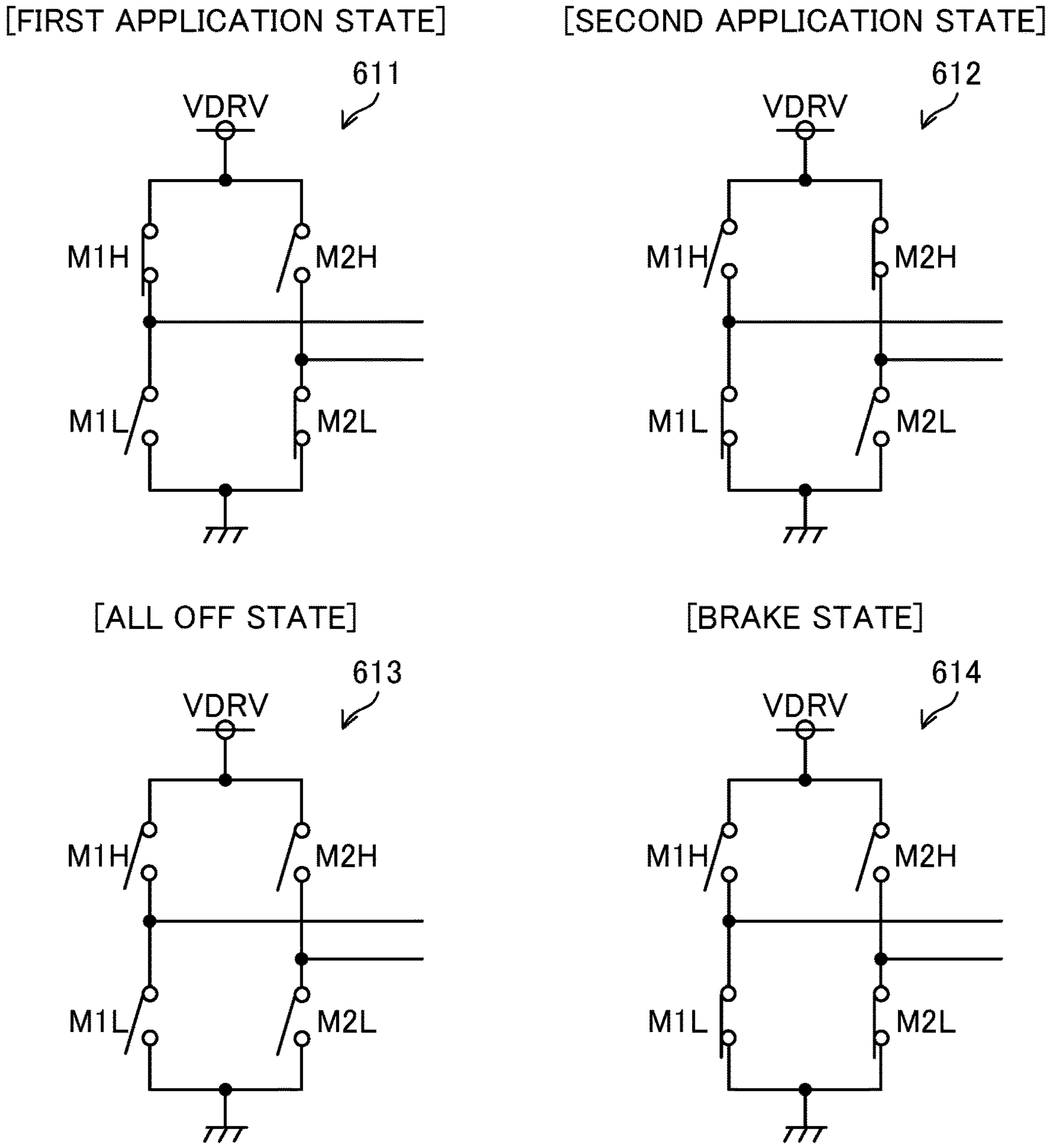
FIG. 4 is a diagram illustrating a plurality of possible states of the driving circuit according to the embodiment of the present disclosure.

The gate driver 112 works using a positive side power supply voltage that is the drive power supply voltage VDRV applied to the line LN2 and a negative side power supply voltage that is the ground voltage (0 V) applied to the line LN1. The gate driver 112 controls gate potentials of the transistors M1H, M1L, M2H and M2L according to a control signal CNT1 supplied from the control circuit 130, so as to individually control on/off states of the transistors M1H, M1L, M2H and M2L. By controlling the gate potentials of the transistors M1H, M1L, M2H and M2L, the driving circuit 111 can be set to one of the states 611 to 614 of FIG. 4. Note that the driving circuit 111 may have a state that is different from any of the states 611 to 614.

The state 611 is a first application state. In the first application state, the transistors M1H and M2L are on state, and the transistors M2H and M1L are off state. The state 612 is a second application state. In the second application state, the transistors M1L and M2H are on state, and the transistors M1H and M2L are off state. The state 613 is all off state. In the all off state, the transistors M1H, M1L, M2H and M2L are all off state. The state 614 is a brake state. In the brake state, the transistors M1L and M2L are on state, and the transistors M1H and M2H are off state.

Figure 5:
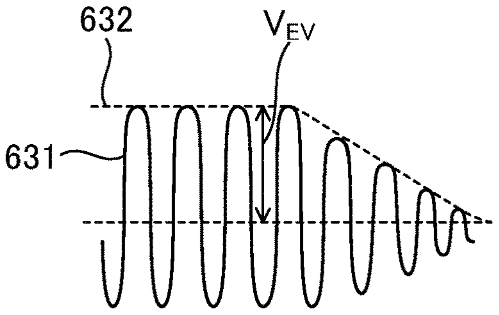
FIG. 5 is a diagram illustrating a relationship between an amplified voltage signal based on a received signal and an envelope signal, according to the embodiment of the present disclosure.

The reception circuit 120 is connected to the input terminals IN1 and IN2, and receives a voltage signal applied between the input terminals IN1 and IN2. Therefore, when the piezoelectric element 20 receives the reflected wave signal W2, the voltage signal generated between the first terminal and the second terminal of the piezoelectric element 20 based on the reflected wave signal W2 is input to the reception circuit 120 via the input terminals IN1 and IN2. The reception circuit 120 performs a predetermined reception signal processing on the voltage signal between the input terminals IN1 and IN2, so as to generate a detection signal based on the voltage signal between the input terminals IN1 and IN2. The reception signal processing includes a DC removing process in which a DC component is removed from the voltage signal between the input terminals IN1 and IN2, an amplification process in which the voltage signal after the DC removing process is amplified, and an envelope detection process in which an envelope of the voltage signal after the amplification process (hereinafter, referred to as an amplified voltage signal) is detected. However, if the capacitors 31 and 32 are disposed between the piezoelectric element 20 and the input terminals IN1 and IN2, respectively, as illustrated in FIG. 3, the DC removing process in the reception signal processing can be omitted. The detection signal generated by the reception circuit 120 includes an envelope signal. In FIG. 5, a solid line waveform 631 is a waveform of the amplified voltage signal, and a broken line waveform 632 is a waveform of the envelope signal. The envelope signal is a voltage signal having a voltage value that is amplitude of the amplified voltage signal. Therefore, the envelope signal has a voltage value that is proportional to the amplitude of the received signal of the reception circuit 120 (i.e., the voltage signal between the input terminals IN1 and IN2) (hereinafter, this voltage value is referred to as a voltage value $V_{EV}$).

The control circuit 130 performs the distance detection process and the proximity detection process described above based on the detection signal generated by the reception circuit 120, and further integrally controls operations of individual sections in the semiconductor device 10. In this control, the control circuit 130 generates and outputs control signals CNT1 to CNT4 and $CNT_{ADJ}$, and further generates and outputs adjustment control signals MV1_CNT and MV2_CNT. In addition, the control circuit 130 includes a storage circuit 131. The storage circuit 131 includes a nonvolatile memory and a volatile memory. The nonvolatile memory in the storage circuit 131 includes a memory (One Time Programmable ROM) that can be written with data only once or a memory that can be rewritten with data. The volatile memory in the storage circuit 131 includes a register.

The damping circuit 140 includes a resistance component 141, an induction component 142, and a bias supply circuit 143. The resistance component 141 and the induction component 142 are elements that are used for reducing reverberation of the piezoelectric element 20, and work as loads of the piezoelectric element 20. Therefore, in the following description, the resistance component 141 and the induction component 142 are referred to as the resistance load 141 and the inductive load 142, respectively. The resistance load 141 and the inductive load 142 are connected in parallel, and the parallel circuit of the resistance load 141 and the inductive load 142 is connected between lines LN12 and LN22. The bias supply circuit 143 supplies a predetermined DC bias voltage (for example, 2 V) to the line LN22. The resistance load 141 is arranged to have a variable resistance value, and the inductive load 142 is arranged to have a variable inductance value. In accordance with the control signal $CNT_{ADJ}$ from the control circuit 130, the resistance value of the resistance load 141 and the inductance value of the inductive load 142 are set in a variable manner.

The switch circuit 150 includes switches 151 and 152. The switch circuit 160 includes switches 161 and 162. Each switch in the switch circuits 150 and 160 can be constituted of one or more MOSFETs. Each switch in the switch circuits 150 and 160 may be a bus switch that can transmit an analog signal. The first terminal of the switch 151 is connected to the line LN10, and the second terminal of the switch 151 is connected to a line LN11. The first terminal of the switch 152 is connected to the line LN20, and the second terminal of the switch 152 is connected to the line LN21. The first terminal of the switch 161 is connected to the line LN11, and the second terminal of the switch 161 is connected to the line LN12. The first terminal of the switch 162 is connected to the line LN21, and the second terminal of the switch 162 is connected to the line LN22.

The switches 151 and 152 are controlled on or off based on a control signal CNT2 supplied from the control circuit 130. The switches 161 and 162 are controlled on or off based on a control signal CNT3 supplied from the control circuit 130. The control signals CNT2 and CNT3, and the control signal CNT4 are each a binary signal having a value 0 or 1. When the control signal CNT2 has the value 1, both the switches 151 and 152 are on state. When the control signal CNT2 has the value 0, both the switches 151 and 152 are off state. When the control signal CNT3 has the value 1, both the switches 161 and 162 are on state. When the control signal CNT3 has the value 0, both the switches 161 and 162 are off state.

The adjustment driving circuit 170 includes output buffers 171 and 172. Each of the output buffers 171 and 172 is a three-state buffer having an input terminal, an output terminal, and a control terminal. The control signal CNT4 from the control circuit 130 is input to the control terminal of each of the buffers 171 and 172. The adjustment control signal MV1_CNT is input to the input terminal of the output buffer 171, and the adjustment control signal MV2_CNT is input to the input terminal of the output buffer 172. The output terminal of the output buffer 171 is connected to the line LN11, and the output terminal of the output buffer 172 is connected to the line LN21. The output buffers 171 and 172 operate based on an internal power supply voltage VDD. Each of the adjustment control signals MV1_CNT and MV2_CNT is a digital signal having a signal level of high level or low level. A voltage or signal at the output terminal of the output buffer 171 is denoted by MV1, and a voltage or signal at the output terminal of the output buffer 172 is denoted by MV2.

Figure 6:
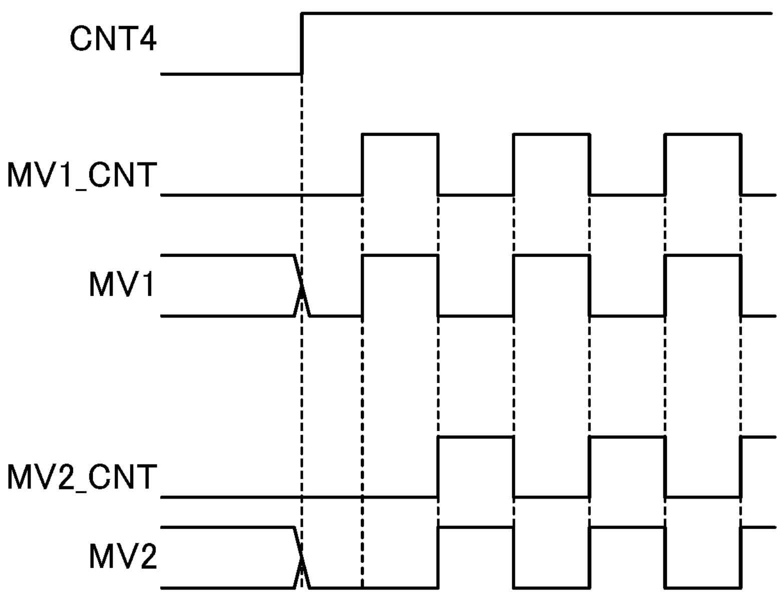
FIG. 6 is a diagram illustrating a relationship among some control signals and two output voltages of output buffers, according to the embodiment of the present disclosure.

FIG. 6 illustrates a relationship among the signals CNT4, MV1_CNT, MV1, MV2_CNT, and MV2. During the period while the control signal CNT4 has the value 1, the output buffer 171 outputs the signal MV1 of high level to the line LN11 if the adjustment control signal MV1_CNT is high level, while it outputs the signal MV1 of low level to the line LN11 if the adjustment control signal MV1_CNT is low level. During the period while the control signal CNT4 has the value 1, the output buffer 172 outputs the signal MV2 of high level to the line LN21 if the adjustment control signal MV2_CNT is high level, while it outputs the signal MV2 of low level to the line LN21 if the adjustment control signal MV2_CNT is low level. The high level of the output signals of the output buffers 171 and 172 has the potential of the internal power supply voltage VDD, and the low level of the output signals of the output buffers 171 and 172 has the ground potential. During the period while the control signal CNT4 has the value 0, the adjustment driving circuit 170 becomes a high impedance state. In the high impedance state of the adjustment driving circuit 170, the output terminal of the output buffer 171 has sufficiently high input impedance viewed from the line LN11, and the output terminal of the output buffer 172 has sufficiently high input impedance viewed from the line LN21. Therefore, during the period while the control signal CNT4 has the value 0, it can be regarded that there is no input and output of current between the line LN11 and the output buffer 171, and that there is no input and output of current between the line LN21 and the output buffer 172.

On the basis of a power supply voltage VCC supplied from a not-shown external power supply device to the semiconductor device 10, the internal power supply circuit 180 generates a plurality of power supply voltages including the drive power supply voltage VDRV and the internal power supply voltage VDD. Each circuit in the semiconductor device 10 works based on any of the power supply voltages generated by the internal power supply circuit 180. For instance, the control circuit 130, the damping circuit 140, and the adjustment driving circuit 170 may work based on the internal power supply voltage VDD. Here, the drive power supply voltage VDRV and the internal power supply voltage VDD each has a positive DC voltage value, and the internal power supply voltage VDD is lower than the drive power supply voltage VDRV. For instance, the drive power supply voltage VDRV is 36 V or 72 V, while the internal power supply voltage VDD is 3 V or 5 V.

Figure 7:
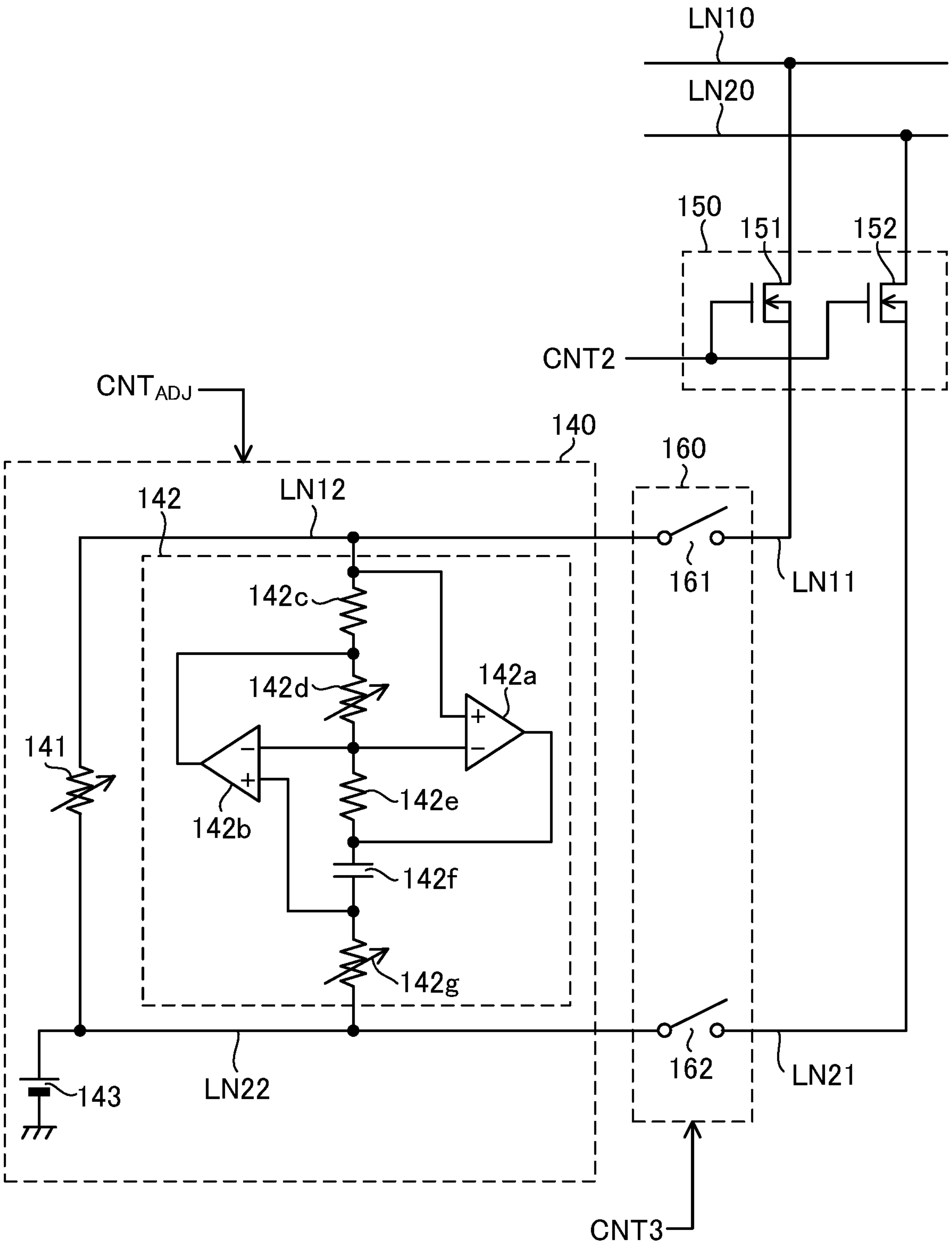
FIG. 7 is a diagram illustrating an example of an internal structure of a damping circuit, according to the embodiment of the present disclosure.

FIG. 7 illustrates an example of a specific structure of the damping circuit 140. In the semiconductor device 10, the inductive load 142 is constituted of a pseudo inductor so that the inductance value of the inductive load 142 can be arbitrarily changed. In FIG. 7, a generalized impedance converter (GIC) circuit is used to constitute the inductive load 142. Specifically, the inductive load 142 of FIG. 7 includes operational amplifiers 142*a* and 142*b*, fixed resistors 142*c* and 142*e*, variable resistors 142*d* and 142*g*, and a capacitor 142*f*. The fixed resistors 142*c* and 142*e* each have a fixed resistance value. In contrast, resistance values of the variable resistors 142*d* and 142*g* can be independently changed according to the control signal $CNT_{ADJ}$ from the control circuit 130, similarly to the resistance value of the resistance load 141. When the resistance values of the variable resistors 142*d* and 142*g* are changed, the inductance value of the inductive load 142 connected between the line LN12 and LN22 is changed.

The first terminal of the fixed resistor 142*c* is commonly connected the line LN12 and a noninverting input terminal of the operational amplifier 142*a*. The second terminal of the resister 142*c* is commonly connected to the first terminal of the variable resistor 142*d* and an output terminal of the operational amplifier 142*b*. The second terminal of the variable resistor 142*d* is commonly connected to inverting input terminals of the operational amplifiers 142*a* and 142*b* and the first terminal of the fixed resistor 142*e*. The second terminal of the fixed resistor 142*e* is commonly connected to the output terminal of the operational amplifier 142*a* and the first terminal of the capacitor 142*f*. The second terminal of the capacitor 142*f* is commonly connected to the first terminal of the variable resistor 142*g* and a noninverting input terminal of the operational amplifier 142*b*. The second terminal of the variable resistor 142*g* is connected to the line LN22. A power supply voltage of the operational amplifiers 142*a* and 142*b* is determined so that the GIC circuit works as an inductive load for the piezoelectric element 20, during the period while the switches 151, 152, 161, and 162 are on state.

In addition, as illustrated in FIG. 7, each of the switches 151 and 152 can be constituted of an N-channel type MOSFET. In this case, in the MOSFET as the switch 151, a drain is connected to the line LN10 while a source is connected to the line LN11. In the MOSFET as the switch 152, a drain is connected to the line LN20 while a source is connected to the line LN21. Then, the common control signal CNT2 is input to gates of the MOSFETs as the switches 151 and 152, and hence the switches 151 and 152 become on state or off state. Note that the structure of the switches 151 and 152 is not limited to that illustrated in FIG. 7 but can be any structure.

Figure 8:
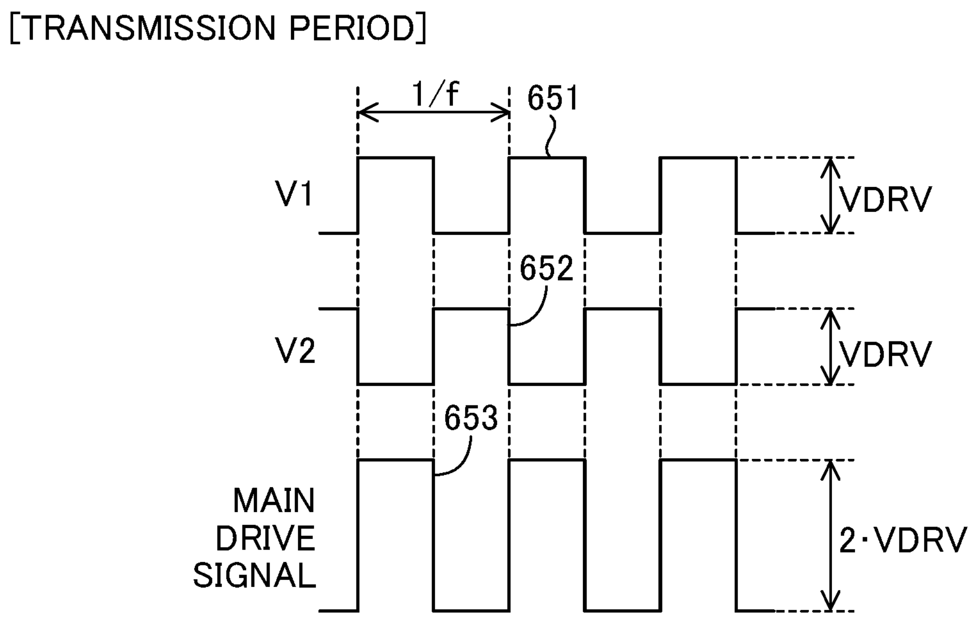
FIG. 8 is a waveform diagram of voltages and a main drive signal supplied to the piezoelectric element in a transmission period, according to the embodiment of the present disclosure.

FIG. 8 illustrates voltage and signal waveforms supplied from the driving circuit 111 to the piezoelectric element 20 in order to transmit the output wave signal W1. The period while the output wave signal W1 is transmitted is referred to as a transmission period. In FIG. 8, waveforms 651 and 652 are waveforms of the voltage V1 applied from the driving circuit 111 to the output terminal DRV1 and the voltage V2 applied to the output terminal DRV2, respectively, during the transmission period. In FIG. 8, the waveform 653 is a waveform of the drive signal supplied from the driving circuit 111 to the piezoelectric element 20 during the transmission period. Note that in order to specifically discriminate between the drive signal supplied from the driving circuit 111 to the piezoelectric element 20 and an adjustment drive signal supplied from the adjustment driving circuit 170 to the piezoelectric element 20 (a second drive signal) as described later, in the following description, the drive signal supplied from the driving circuit 111 to the piezoelectric element 20 is referred to as a main drive signal (a first drive signal) in the following description.

Under control by the control circuit 130, during the transmission period, the state of the driving circuit 111 is changed alternately and periodically between the first application state and the second application state. As a result, during the transmission period, each of the voltages V1 and V2 becomes a rectangular wave signal having alternating low and high levels, and phases of the voltages V1 and V2 are different from each other by 180 degrees. During the transmission period, the voltage difference between low level and high level of the voltage V1 is equal to the magnitude of the drive power supply voltage VDRV. The same is true for the voltage V2. The main drive signal corresponds to the voltage signal applied between the output terminals DRV1 and DRV2 during the transmission period, and here, it is the voltage signal having the potential of the output terminal DRV1 viewed from the potential of the output terminal DRV2. Therefore, during the transmission period, the main drive signal is a rectangular wave signal having amplitude twice the amplitude of the voltage V1. During the transmission period, the voltages V1 and V2 and the main drive signal have the same frequency f as a matter of course.

When the supply of the main drive signal to the piezoelectric element 20 is stopped after it is supplied, the piezoelectric element 20 continues to oscillate for a while based on kinetic energy accumulated in itself during the transmission period. The oscillation of the piezoelectric element 20 after stopping the supply of the main drive signal is called reverberation. The period of time while the reverberation continues is called a reverberation time. If the reverberation time is long, it is difficult to detect an object at close range. After stopping the supply of the main drive signal to the piezoelectric element 20, a signal having a phase opposite to that of the main drive signal is supplied to the piezoelectric element 20, thereby the reverberation time can be reduced. In this embodiment, after stopping the supply of the main drive signal to the piezoelectric element 20, a signal having a phase different from that of the main drive signal is supplied from the driving circuit 111 to the piezoelectric element 20, as a main damping signal (a first damping signal), and thus the reverberation time is reduced. The period while the main damping signal is supplied to the piezoelectric element 20 is called a first damping period.

Figure 9:
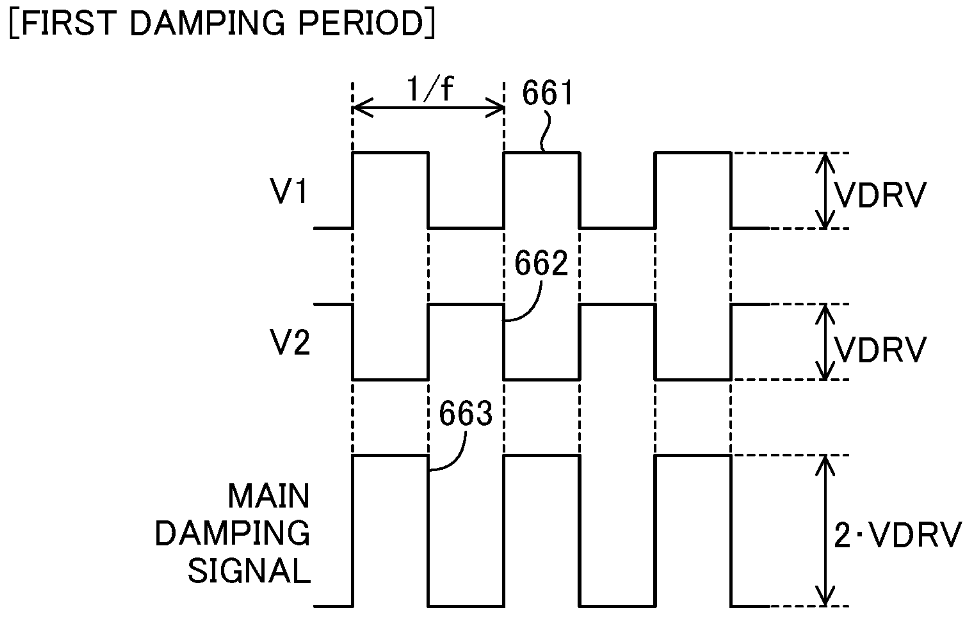
FIG. 9 is a waveform diagram of the voltages and the main damping signal supplied to the piezoelectric element in a first damping period, according to the embodiment of the present disclosure.

FIG. 9 illustrates a waveform 661 of the voltage V1 applied from the driving circuit 111 to the output terminal DRV1, a waveform 662 of the voltage V2 applied from the driving circuit 111 to the output terminal DRV2, and a waveform 663 of the main damping signal applied from the driving circuit 111 to the piezoelectric element 20, during the first damping period. Under control by the control circuit 130, during the first damping period, the state of the driving circuit 111 is changed alternately and periodically between the first application state and the second application state. As a result, in the first damping period, each of the voltages V1 and V2 is a rectangular wave signal having alternating low and high levels, and phases of the voltages V1 and V2 are different from each other by 180 degrees. In the first damping period, the voltage difference of the voltage V1 between low level and high level is equal to the magnitude of the drive power supply voltage VDRV. The same is true for the voltage V2. The main damping signal corresponds to the voltage signal applied between the output terminals DRV1 and DRV2 during first damping period, and here, it is a voltage signal having a potential of the output terminal DRV1 viewed from the potential of the output terminal DRV2. Therefore, during the first damping period, the main damping signal is a rectangular wave signal having an amplitude twice that of the voltage V1. During the first damping period, the voltages V1 and V2 and the main damping signal have the same frequency f as a matter of course. In addition, the main drive signal during the transmission period and the main damping signal during the first damping period have the same frequency f.

Figure 10:
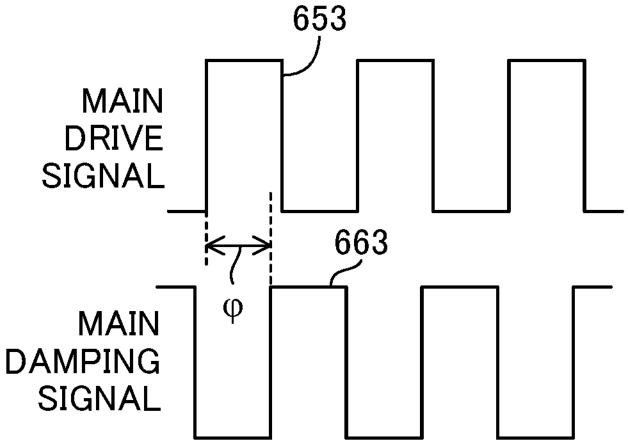
FIG. 10 is a diagram illustrating a phase relationship between the main drive signal and the main damping signal, according to the embodiment of the present disclosure.

FIG. 10 illustrates the waveforms 653 and 663 of the main drive signal and the main damping signal, respectively. The main drive signal and the main damping signal are not simultaneously supplied to the piezoelectric element 20, but in order to show their phase relationship, the waveforms 653 and 663 of the main drive signal and the main damping signal are aligned vertically in FIG. 10, for convenience sake. A phase of the main damping signal with respect to a phase of the main drive signal is denoted by (p. Here, it is supposed that the phase of the main damping signal is delayed from that of the main drive signal, and that a phase lag of the main damping signal with respect to the main drive signal is the phase (p.

The main damping signal may be also referred to as a damping pulse signal. The damping pulse signal is effective for reducing the reverberation at a range where the reverberation has high amplitude (amplitude of the piezoelectric element 20 due to the reverberation), but when the amplitude of the reverberation is getting lowered, the damping pulse signal itself may cause a new reverberation. On the other hand, also by connecting a resistance load or an inductive load to the piezoelectric element 20 after stopping the supply of the main drive signal, the reverberation can be reduced due to absorption of the kinetic energy of the piezoelectric element 20. Here, the resistance load or the inductive load can have a higher effect of reducing the reverberation, when the reverberation has smaller amplitude, while the effect of reducing the reverberation becomes lower when the reverberation has lager amplitude due to restriction of a circuit voltage or the like. The inventors have obtained this knowledge.

On the basis of this knowledge, the inventors have developed the reverberation reduction operation as described below. The reverberation reduction operation is performed by the control circuit 130 using the driving circuit 111 and the damping circuit 140, after stopping the supply of the main drive signal to the piezoelectric element 20. In short, in the reverberation reduction operation, after stopping the supply of the main drive signal to the piezoelectric element 20, the main damping signal is supplied from the driving circuit 111 to the piezoelectric element 20, and after stopping the supply of the main damping signal, the damping circuit 140 is connected to the piezoelectric element 20. This reverberation reduction operation can quickly reduce the reverberation (i.e., the reverberation time can be reduced).

Figure 11:
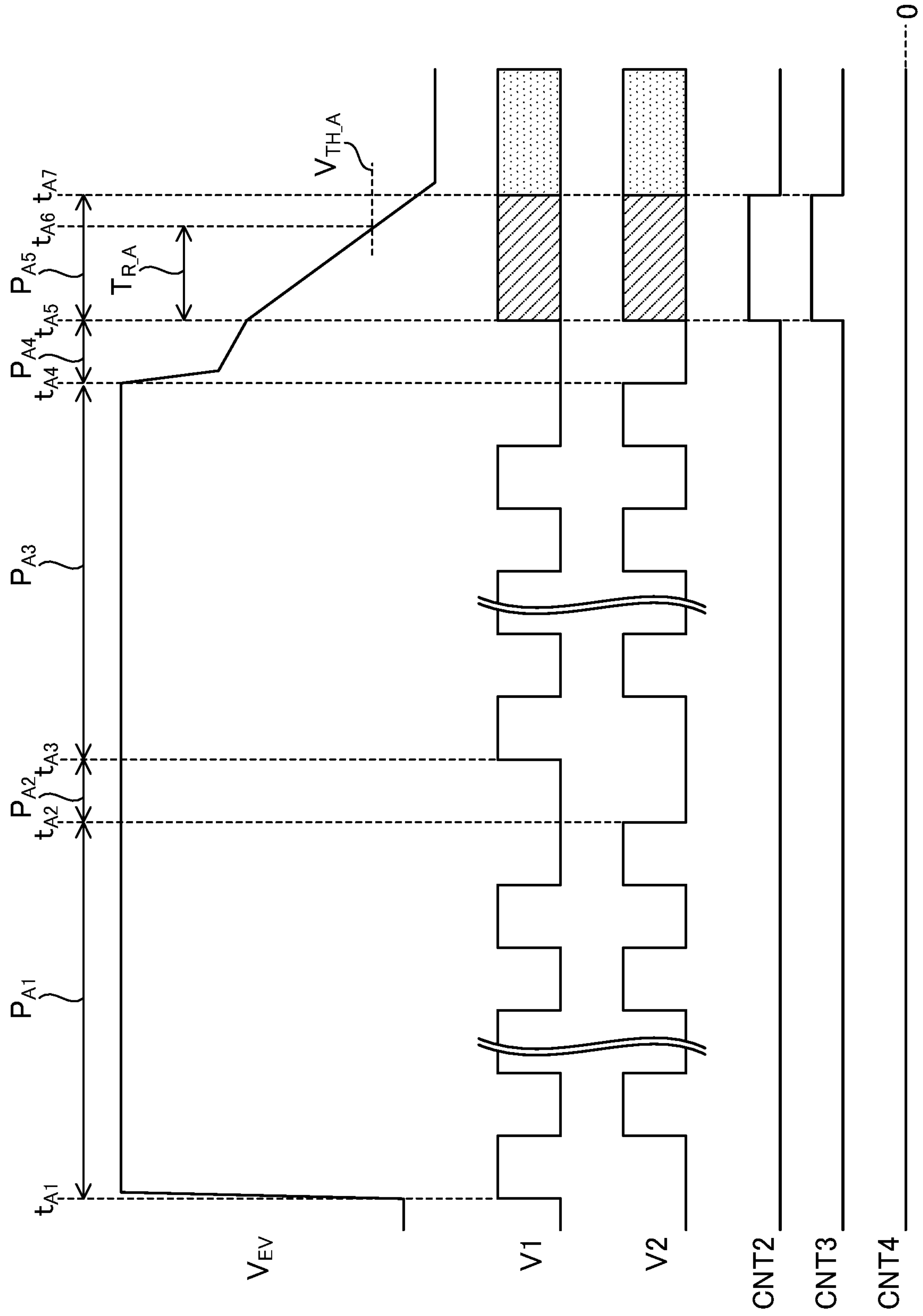
FIG. 11 is a timing chart of an operation accompanied with supply of the main drive signal and the main damping signal to the piezoelectric element (a detection unit operation), according to the embodiment of the present disclosure.

FIG. 11 illustrates a timing chart of an operation that is accompanied with the supply of the main drive signal and the main damping signal to the piezoelectric element 20 (corresponding to a detection unit operation described later). FIG. 11 schematically illustrates the voltage value $V_{EV}$ of the envelope signal by the reception circuit 120 (see FIG. 5) at the topmost. It is supposed that time points $t_{A1}$, $t_{A2}$, $t_{A3}$, $t_{A4}$, $t_{A5}$, $t_{A6}$ and $t_{A7}$ appear in this order over time. The operation from time point $t_{A2}$ to time point $t_{A7}$ corresponds to the reverberation reduction operation.

During the period between time points $t_{A1}$ and $t_{A2}$ is a transmission period $P_{A1}$ during which the main drive signal is supplied from the driving circuit 111 to the piezoelectric element 20. The transmission period $P_{A1}$ has a length corresponding to the product of the reciprocal of the frequency f of the main drive signal and the number of transmission waves. The number of transmission waves during the transmission period $P_{A1}$ is equal to a periodic number of the main drive signal during the transmission period $P_{A1}$. The number of transmission waves during the transmission period $P_{A1}$ has a predetermined number (that is 2 or more, or 10 for example), which is set based on data in a predetermined register of the storage circuit 131. Here, it is supposed that when the driving circuit 111 is changed from the brake state to the first application state at time point $t_{A1}$, the transmission period $P_{A1}$ starts. After that, when the driving circuit 111 is changed from the second application state to the brake state at time point $t_{A2}$, the transmission period $P_{A1}$ ends (see FIG. 4 as necessary).

The period between time points $t_{A2}$ and $t_{A3}$ is a first brake period $P_{A2}$. During the first brake period $P_{A2}$, the driving circuit 111 is maintained in the brake state. The first brake period $P_{A2}$ has a length that is shorter than the reciprocal of the frequency f (i.e., one period length of the main drive signal), and is equal or close to a half the reciprocal of the frequency f.

The period between time points $t_{A3}$ and $t_{A4}$ is a first damping period $P_{A3}$ during which the main damping signal is supplied from the driving circuit 111 to the piezoelectric element 20. The first damping period $P_{A3}$ has a length corresponding to the product of the reciprocal of the frequency f of the main damping signal and the number of damping waves. The number of damping waves during the first damping period $P_{A3}$ is equal to the periodic number of the main damping signal during the first damping period $P_{A3}$.

The number of damping waves during the first damping period $PA_3$ may be constant regardless of the number of transmission waves. The first damping period $PA_3$ may have a fixed length that is determined based on data stored in the nonvolatile memory in the storage circuit 131. When the driving circuit 111 is changed from the brake state to the first application state at time point $t_{A3}$, the first damping period $PA_3$ starts. After that, when the driving circuit 111 is changed from the second application state to the brake state at time point $t_{A4}$, the first damping period $PA_3$ ends (see FIG. 4 as necessary). The main damping signal has a phase φ that is specified by the length of the first brake period $P_{A2}$. When the length of the first brake period $P_{A2}$ is denoted by T, the phase φ of the main damping signal is expressed by $\varphi=T/(1/f)\times 2\pi$ in radians expression.

The period between time points $t_{A4}$ and $t_{A5}$ is a second brake period $P_{A4}$. During the second brake period $P_{A4}$, the driving circuit 111 is maintained in the brake state. The second brake period $P_{A4}$ may have a predetermined length depending on the frequency f. It is preferred that the length of the second brake period $P_{A4}$ is shorter than the reciprocal of the frequency f (i.e., one period length of the main drive signal). Note that it may be possible to eliminate the second brake period $P_{A4}$ as a variation, and in this case, it is understood that the time point $t_{A4}$ and the time point $t_{A5}$ are the same time point.

The period between time points $t_{A5}$ and $t_{A7}$ is a second damping period $P_{A5}$ during which the damping circuit 140 is connected to the piezoelectric element 20. In the second damping period $P_{A5}$, the driving circuit 111 is maintained in the all off state. In FIG. 11, hatching areas of waveforms of the voltages V1 and V2 indicate the all off state of the driving circuit 111. During time points $t_{A1}$ and $t_{A5}$, the control signals CNT2 and CNT3 both have the value 0. During time points $t_{A5}$ and $t_{A7}$, the control signals CNT2 and CNT3 both have the value 1. Therefore, the damping circuit 140 is connected to the piezoelectric element 20 via the switch circuits 160 and 150 and the output terminals DRV1 and DRV2 (specifically, the line LN12 is connected to the first terminal of the piezoelectric element 20 and the line LN22 is connected to the second terminal of the piezoelectric element 20), only between the time points $t_{A5}$ and $t_{A7}$ in the period between time points $t_{A1}$ and $t_{A7}$. The value of the control signal CNT4 is maintained at 0 during the period between time points $t_{A1}$ and $t_{A7}$, and hence the adjustment driving circuit 170 has no relations with the operation illustrated in FIG. 11.

The control circuit 130 changes values of the control signals CNT2 and CNT3 from 1 to 0 at time point $t_{A7}$, so as to separate the damping circuit 140 from the piezoelectric element 20 (to disconnect between the damping circuit 140 and the piezoelectric element 20). In addition, after time point $t_{A7}$, the control circuit 130 sets the state of the driving circuit 111 to a defined state (corresponding to dotted areas in FIG. 11). Typically, after time point $t_{A7}$, the driving circuit 111 is set to the all off state for preparation of the reception operation. It is also possible as a variation to fix one of the output terminals DRV1 and DRV2 to a predetermined potential (for example, the ground potential) and to set the other terminal to an open state.

The voltage value $V_{EV}$ of the envelope signal is getting lowered from time point $t_{A4}$. Then, after time point $t_{A5}$, the voltage value $V_{EV}$ is changed from higher than a predetermined threshold value $V_{TH\_A}$ to lower than the predetermined threshold value $V_{TH\_A}$ at time point $t_{A6}$. The time period between time points $t_{A5}$ and $t_{A6}$ is specially referred to as ringing time $T_{R\_A}$. The control circuit 130 includes a comparator (not shown) that compares the voltage value $V_{EV}$ with the predetermined threshold value $V_{TH\_A}$, and detects the ringing time $T_{R\_A}$ based on a comparison result by the comparator. On the basis of the detection result of the ringing time $T_{R\_A}$, the control circuit 130 determines the time point to separate the damping circuit 140 from the piezoelectric element 20, i.e., time point $t_{A7}$ For instance, the control circuit 130 sets time point $t_{A7}$, which is a time point when the product of the ringing time $T_{R\_A}$ and a predetermined coefficient (for example, 0.25) has elapsed from time point $t_{A6}$. It may be possible to set time point $t_{A7}$, which is a time point when a predetermined time Δt, which does not depend on the ringing time $T_{R\_A}$, has elapsed from time point $t_{A6}$.

At time point $t_{A7}$ or just after time point $t_{A7}$, the reverberation is sufficiently reduced. On the basis of the voltage signal between the input terminals IN1 and IN2 during a reception period set after time point $t_{A7}$, the reception circuit 120 generates the detection signal (hereinafter, referred to as the detection signal during the reception period). On the basis of the detection signal during the reception period, the control circuit 130 can perform the distance detection process and the proximity detection process described above.

Figure 12:
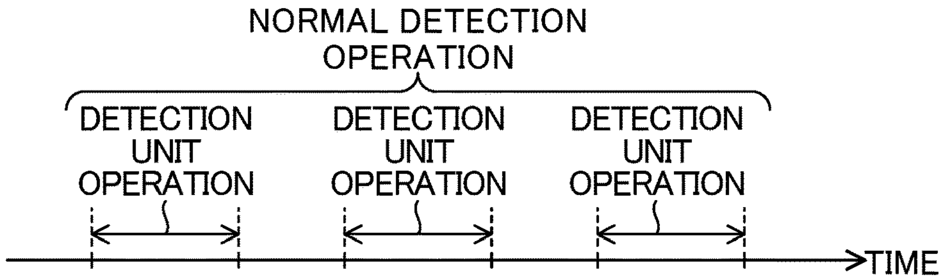
FIG. 12 is a diagram illustrating a manner where the detection unit operation is repeated a plurality of times in a normal detection operation, according to the embodiment of the present disclosure.

With reference to FIG. 12, a series of operations, which includes the above operation between time points $t_{A1}$ and $t_{A7}$ and the operation during the reception period after time point $t_{A7}$, are referred to as the detection unit operation. In response to a command from the host block 2, the semiconductor device 10 can perform the detection unit operation once or more under control by the control circuit 130. In each detection unit operation, the distance detection process and the proximity detection process are performed. FIG. 12 illustrates a manner in which a plurality of the detection unit operations are performed sequentially and repeatedly. The operation including one or more of the detection unit operations is referred to as a normal detection operation.

In order to effectively reduce the reverberation, it is necessary to appropriately set the phase φ of the main damping signal corresponding to the damping pulse. However, the appropriate phase φ changes variously depending on individual variation of the piezoelectric element 20, ambient temperature of the ultrasonic sensor 1, or the like. Similarly, in order to effectively reduce the reverberation, the resistance value of the resistance load 141 and the inductance value of the inductive load 142 should be set appropriately. Considering these, before the normal detection operation, the semiconductor device 10 performs an adjustment operation for appropriately set the phase φ of the main damping signal, the resistance value of the resistance load 141, and the inductance value of the inductive load 142.

Figure 13:
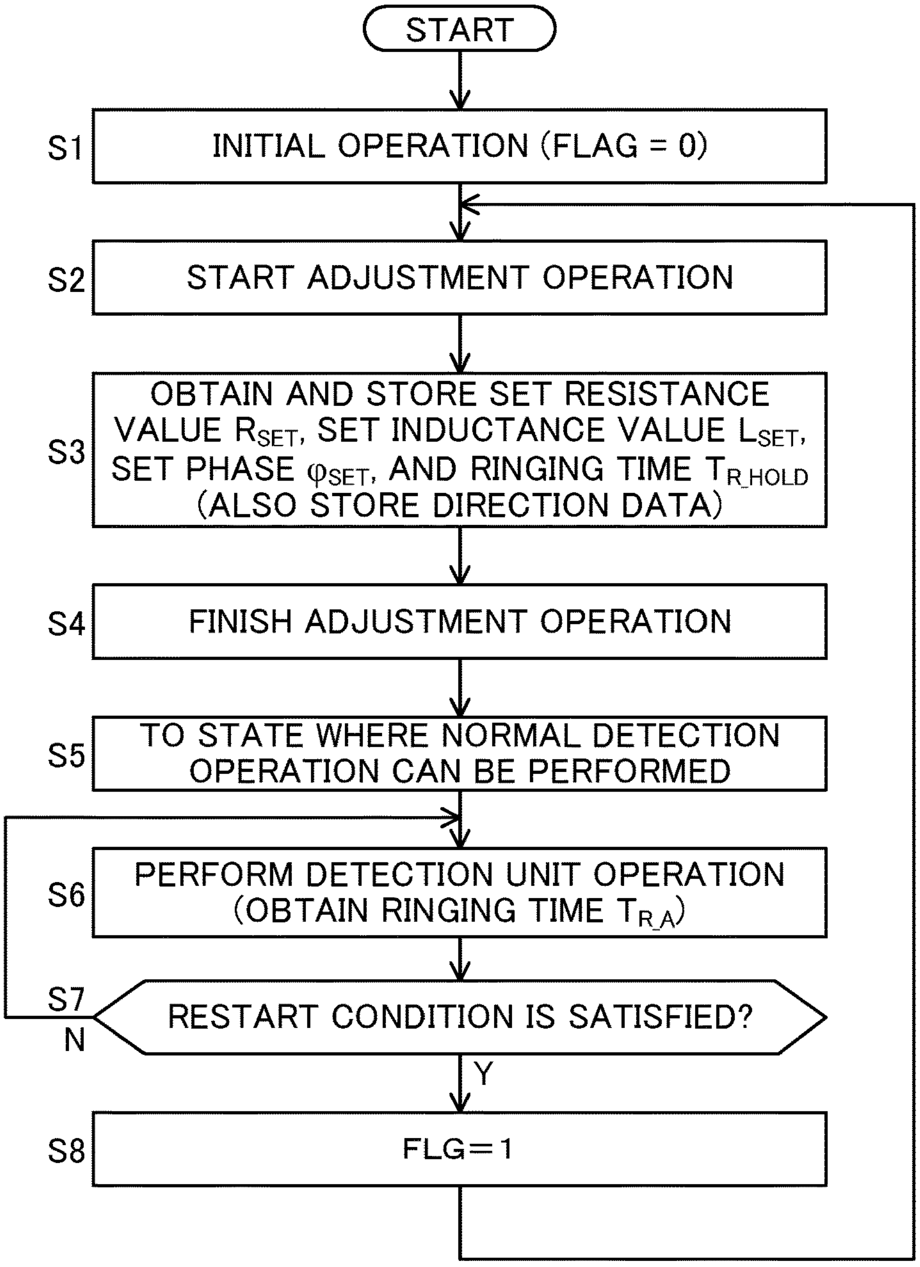
FIG. 13 is a flowchart of a general operation of the ultrasonic sensor, according to the embodiment of the present disclosure.
Figure 14:
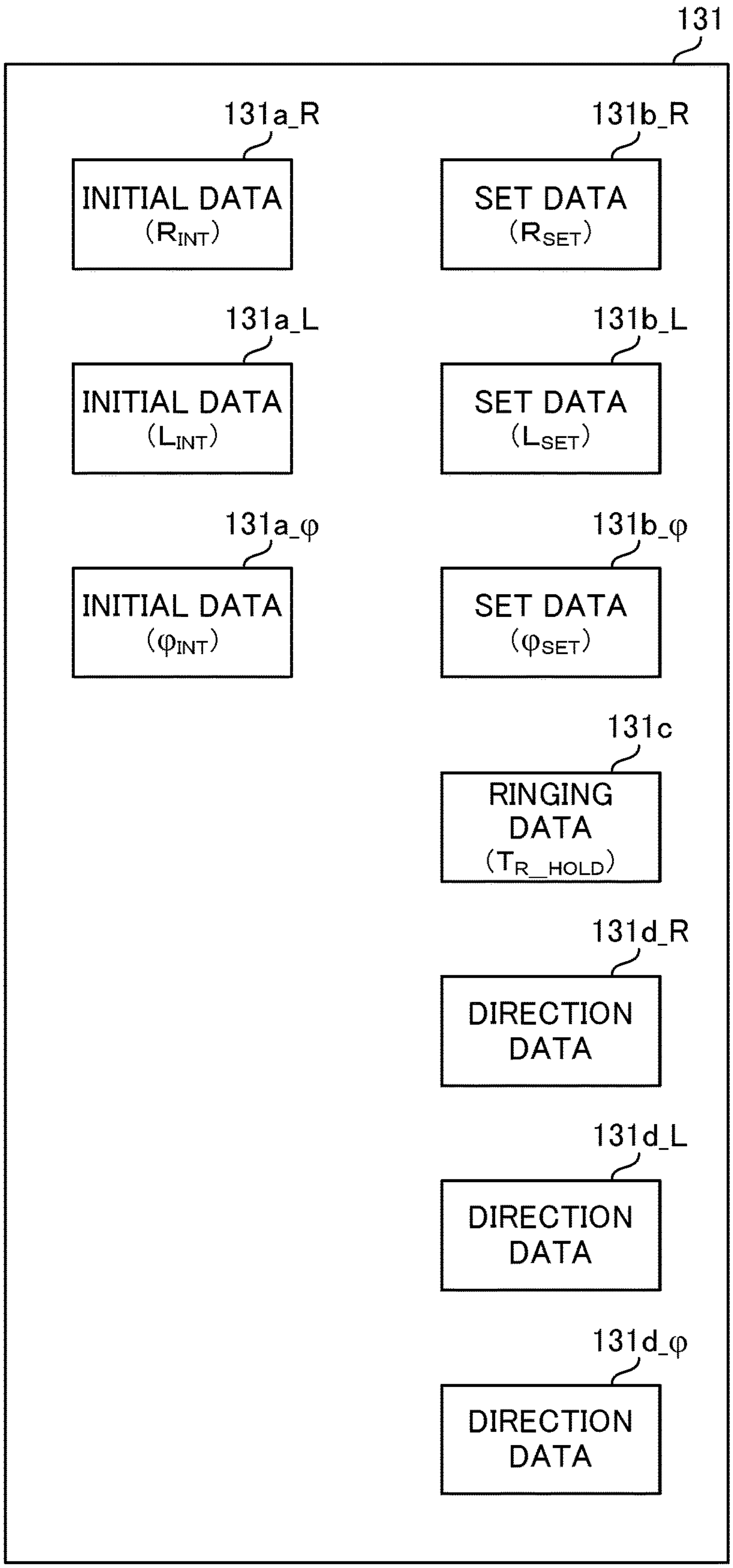
FIG. 14 is an explanatory diagram of data stored in a storage circuit of the semiconductor device, according to the embodiment of the present disclosure.

FIG. 13 illustrates a general flowchart of the ultrasonic sensor 1. FIG. 14 illustrates some data stored in the storage circuit 131 of FIG. 3. When starting the supply of the power supply voltage VCC to the semiconductor device 10, the semiconductor device 10 is activated, and a predetermined initial operation is performed in Step S1. After that, in Step S2, the semiconductor device 10 starts the adjustment operation. In the initial operation, a flag FLG managed by the control circuit 130 is initialized to 0 (i.e., 0 is substituted into the flag FLG). When the adjustment operation is performed, a set resistance value $R_{SET}$, a set inductance value $L_{SET}$, and a set phase $φ_{SET}$, and a ringing time $T_{R\_HOLD}$ are obtained in Step S3, and set data 131*b*_R indicating the set resistance value $R_{SET}$, set data 131*b*_L indicating the set inductance value $L_{SET}$, set data 131*b*_φ indicating the set phase $φ_{SET}$, and ringing data 131*c* indicating the ringing time $T_{R\_HOLD}$ are stored in the storage circuit 131 (see FIG. 14). Furthermore, in Step S3, direction data 131*d*_R, 131*d*_L and 131*d*_φ are also obtained and stored in the storage circuit 131 (see FIG. 14). Meanings of these data will be described later. After obtaining and storing data in Step S3, the adjustment operation is finished in Step S4, and then in Step S5, the semiconductor device 10 is changed to a state where the normal detection operation can be performed. After that, in response to a command from the host block 2, the semiconductor device 10 performs the detection unit operation in Step S6. The ringing time $T_{R\_A}$ is measured and obtained in each of the detection unit operations. Every time when the detection unit operation is performed, the control circuit 130 determines in Step S7 whether or not a predetermined restart condition is satisfied. If the restart condition is not satisfied, the process returns to Step S6. If the restart condition is satisfied, 1 is substituted into the flag FLG in Step S8 and the process returns to Step S2 in which the adjustment operation is performed again. The restart condition will be described later. Hereinafter, if the flag FLG has the value 0, it may be expressed by FLG=0. Further, if the flag FLG has the value 1, it may be expressed by FLG=1. The individual data obtained in Step S3 are stored in the volatile memory (such as the register) in the storage circuit 131. However, it may be possible to store the individual data obtained in Step S3 in the nonvolatile memory of the storage circuit 131. In addition, initial data 131*a*_R indicating an initial resistance value R INT, initial data 131*a*_L indicating an initial inductance value $L_{INT}$, and initial data 131*a*_φ indicating an initial phase $φ_{INT}$ are stored in the nonvolatile memory of the storage circuit 131 in advance. The control circuit 130 can refer to each initial data when the adjustment operation starts.

[Adjustment Operation]

The adjustment operation is described. The adjustment operation can be referred to as a calibration operation. The adjustment operation includes an adjustment operation for resistance load, an adjustment operation for inductive load, and an adjustment operation for phase. In the adjustment operation for resistance load, the set resistance value $R_{SET}$ is obtained, which is the resistance value of the resistance load 141 suitable for reducing (ideally, minimizing) the ringing time $T_{R\_A}$ in the normal detection operation. In the adjustment operation for inductive load, the set inductance value $L_{SET}$ is obtained, which is the inductance value of the inductive load 142 suitable for reducing (ideally, minimizing) the ringing time $T_{R\_A}$ in the normal detection operation. In the adjustment operation for phase, the set phase (p SET is obtained, which is the phase φ suitable for reducing (ideally, minimizing) the ringing time $T_{R\_A}$ in the normal detection operation.

Each of the adjustment operation for resistance load, the adjustment operation for inductive load, and the adjustment operation for phase includes a plurality of times of the adjustment unit operation. In the adjustment operation for resistance load, the adjustment unit operation of measuring a reverberation state, when driving the piezoelectric element 20 like the detection unit operation, is performed a plurality of times while switching the resistance value of the resistance load 141 at a plurality of steps, and the resistance value of the resistance load 141 that is expected to minimize the reverberation time is obtained as the set resistance value $R_{SET}$. The same is true for the adjustment operation for inductive load and the adjustment operation for phase. However, if the drive signal having a large amplitude due to the drive power supply voltage VDRV is used for performing the adjustment operation, signal components of peripheral reflected waves may be mixed with the reverberation signal component, so that the adjustment cannot be performed correctly (i.e., it becomes hard to obtain the optimal set resistance value $R_{SET}$ or the like). Considering this, in the adjustment operation, the adjustment driving circuit 170 that is a small amplitude driver is used to drive the piezoelectric element 20, and the reverberation state in this case is used for obtaining the set resistance value $R_{SET}$ or the like.

Figure 15:
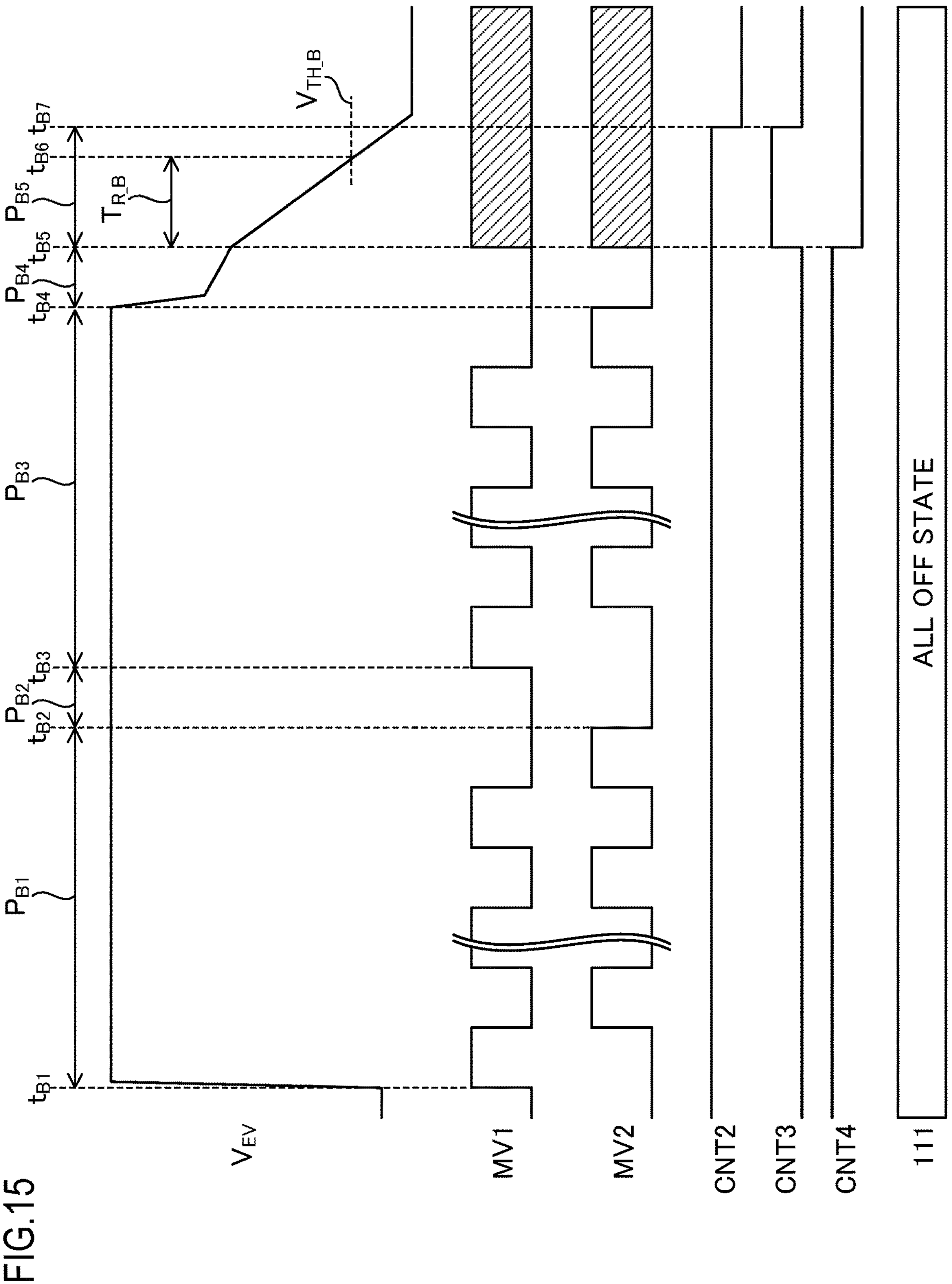
FIG. 15 is a timing chart of an adjustment unit operation, according to the embodiment of the present disclosure.

FIG. 15 illustrates a timing chart of the adjustment unit operation. In FIG. 15, the voltage value $V_{EV}$ (see FIG. 5) of the envelope signal by the reception circuit 120 is schematically illustrated at the topmost. It is supposed that time points $t_{B1}$, $t_{B2}$, $t_{B3}$, $t_{B4}$, $t_{B5}$, $t_{B6}$, and $t_{B7}$ appear in this order over time. In each adjustment unit operation, the control signal CNT2 has a value of 1 from before time point $t_{B1}$, and the value is changed from 1 to 0 at time point $t_{B7}$. However, after the adjustment operation is started in Step S2 of FIG. 13 until all the adjustment operation is finished in Step S4, the value of the control signal CNT2 may be fixed to 1. In each adjustment unit operation, the value of the control signal CNT3 is 1 only during the period between time points $t_{B5}$ and $t_{B7}$, and it is 0 in other period. In each adjustment unit operation, the value of the control signal CNT4 is 1 from before time point $t_{B1}$, and is changed from 1 to 0 at time point $t_{B5}$, and is 0 after that. In the period during which both values of the control signal CNT2 and CNT4 are 1, the output voltage MV1 of the output buffer 171 is equal to the voltage V1 at the output terminal DRV1, and the output voltage MV2 of the output buffer 172 is equal to the voltage V2 at the output terminal DRV2. After the adjustment operation is started in Step S2 of FIG. 13 until all the adjustment operation is finished in Step S4, the driving circuit 111 is maintained in the all off state, and the input impedance of the driving circuit 111 viewed from the output terminals DRV1 and DRV2 can be regarded to be sufficiently high.

Figure 16:
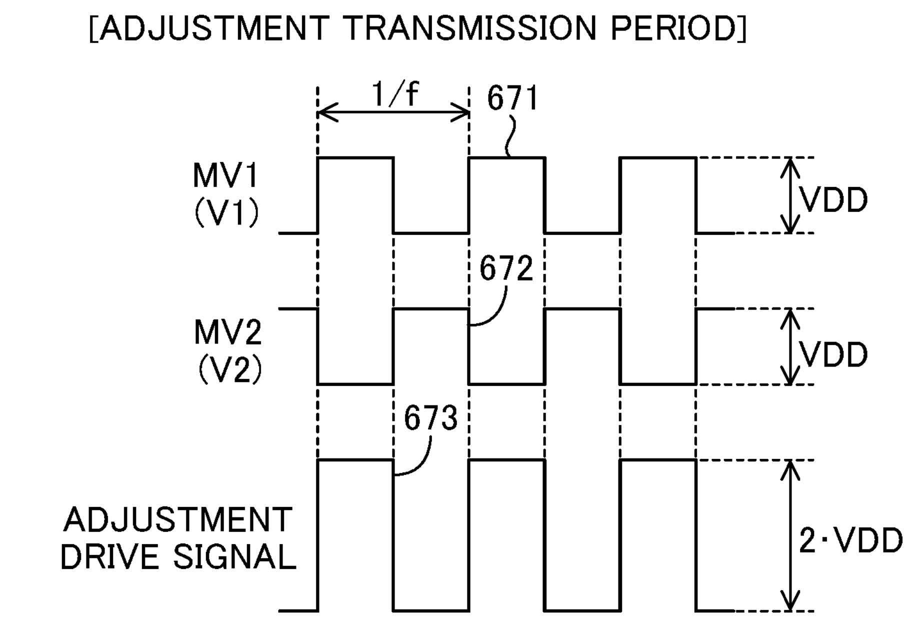
FIG. 16 is a waveform diagram of voltages and an adjustment drive signal to be supplied to the piezoelectric element in an adjustment transmission period, according to the embodiment of the present disclosure.

The period between time points $t_{B1}$ and $t_{B2}$ is an adjustment transmission period $P_{B1}$ during which the adjustment drive signal is supplied from the adjustment driving circuit 170 to the piezoelectric element 20. In FIG. 16, waveforms 671 and 672 are respectively the output voltages MV1 and MV2 of the adjustment driving circuit 170 during the adjustment transmission period $P_{B1}$ (therefore, waveforms of the voltages V1 and V2). In FIG. 16, a waveform 673 is a waveform of the adjustment drive signal supplied from the adjustment driving circuit 170 to the piezoelectric element 20 during the adjustment transmission period $P_{B1}$. During the adjustment transmission period $P_{B1}$, according to the adjustment control signals MV1_CNT and MV2_CNT from the control circuit 130, the voltages MV1 and MV2 become rectangular wave signals having alternating low and high levels, and the voltages MV1 and MV2 have phases different from each other by 180 degrees. During the adjustment transmission period $P_{B1}$, the voltage difference between low level and high level of the voltage MV1 is equal to the magnitude of the internal power supply voltage VDD. The same is true for the voltage MV2. The adjustment drive signal corresponds to the voltage signal applied between the output terminals DRV1 and DRV2 during the adjustment transmission period $P_{B1}$, and here, it is supposed to be a voltage signal having the potential of the output terminal DRV1 viewed from the potential of the output terminal DRV2. Therefore, during the adjustment transmission period $P_{B1}$, the adjustment drive signal is a rectangular wave signal having an amplitude twice that of the voltage MV1. The frequency of the voltages MV1 and MV2 and the adjustment drive signal during the adjustment transmission period $P_{B1}$ is the same as the frequency f of the main drive signal during the transmission period $P_{A1}$. Therefore, the adjustment drive signal is also a signal in the ultrasonic band similarly to the main drive signal. The amplitude of the adjustment drive signal is smaller than the amplitude of the main drive signal, and the amplitude ratio of the adjustment drive signal to the main drive signal is VDD/VDRV.

In addition, the adjustment transmission period $P_{B1}$ has the same length as the transmission period $P_{A1}$, and hence the periodic number (the number of waves) of the adjustment drive signal during the adjustment transmission period $P_{B1}$ is the same as the periodic number (the number of waves) of the main drive signal during the transmission period $P_{A1}$. Here, it is supposed that the voltages MV1 and MV2 are both low level before time point $t_{B1}$, and that the adjustment transmission period $P_{B1}$ starts when the voltage MV1 is changed from low level to high level at time point $t_{B1}$. After that, the adjustment transmission period $P_{B1}$ ends when the voltage MV2 is changed from high level to low level at time point $t_{B2}$.

The period between time points $t_{B2}$ and $t_{B3}$ is a first adjustment brake period $P_{B2}$. During the first adjustment brake period $P_{B2}$, the voltages MV1 and MV2 are both maintained at low level. The first adjustment brake period $P_{B2}$ has a length that is shorter than the reciprocal of the frequency f (i.e., one period length of the adjustment drive signal), and is equal or close to a half the reciprocal of the frequency f.

Figure 17:
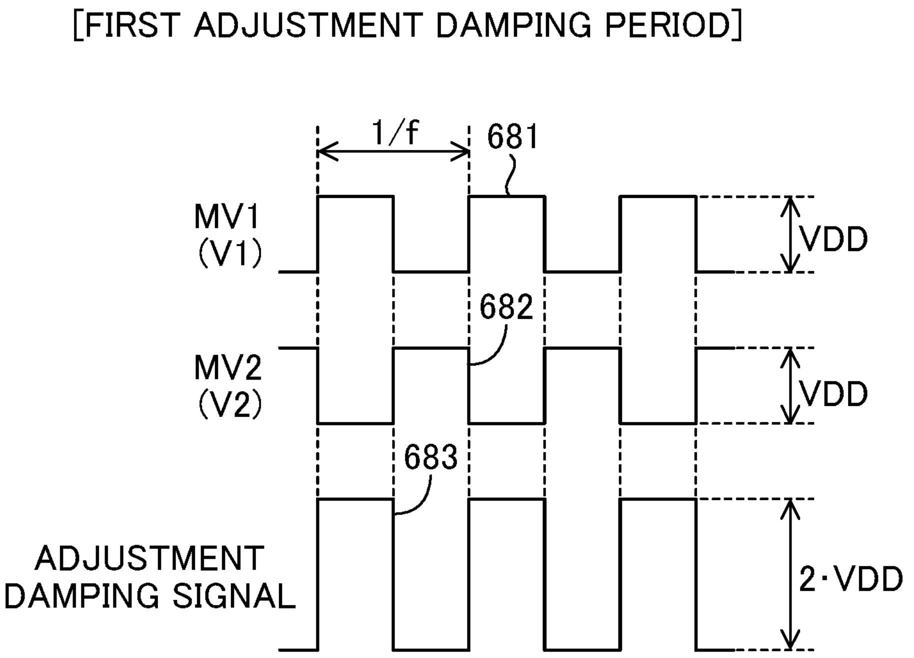
FIG. 17 is a waveform diagram of the voltages and the adjustment damping signal to be supplied to the piezoelectric element in a first adjustment damping period, according to the embodiment of the present disclosure.

The period between time points $t_{B3}$ and $t_{B4}$ is a first adjustment damping period $P_{B3}$ during which an adjustment damping signal (a second damping signal) is supplied from the adjustment driving circuit 170 to the piezoelectric element 20. In FIG. 17, waveforms 681 and 682 are respectively waveforms of the output voltages MV1 and MV2 of the adjustment driving circuit 170 (i.e., waveforms of the voltages V1 and V2) during the first adjustment damping period $P_{B3}$. In FIG. 17, a waveform 683 is a waveform of the adjustment damping signal supplied from the adjustment driving circuit 170 to the piezoelectric element 20 during the first adjustment damping period $P_{B3}$. During the first adjustment damping period $P_{B3}$, according to the adjustment control signals MV1_CNT and MV2_CNT from the control circuit 130, the voltages MV1 and MV2 are each a rectangular wave signal having alternating low and high levels, and the voltages MV1 and MV2 have phases that are different from each other by 180 degrees. During the first adjustment damping period $P_{B3}$, the voltage difference of the voltage MV1 between low level and high level is equal to the magnitude of the internal power supply voltage VDD. The same is true for the voltage MV2. The adjustment damping signal corresponds to a voltage signal applied between the output terminals DRV1 and DRV2 during the first adjustment damping period $P_{B3}$, and here, it is supposed to be a voltage signal having a potential of the output terminal DRV1 viewed from the potential of the output terminal DRV2. Therefore, during the first adjustment damping period $P_{B3}$, the adjustment damping signal is a rectangular wave signal having an amplitude twice the amplitude of the voltage MV1. The frequency of the voltages MV1 and MV2 and the adjustment damping signal during the first adjustment damping period $P_{B3}$ is the same as the frequency f of the main damping signal during the transmission period $P_{A1}$ (see FIG. 11). In the same manner that the adjustment drive signal has an amplitude smaller than that of the main drive signal, the amplitude of the adjustment damping signal is smaller than the amplitude of the main damping signal, and the amplitude ratio of the adjustment damping signal to the main damping signal is VDD/VDRV.

In addition, the first adjustment damping period $P_{B3}$ has the same length as the first damping period $P_{A3}$ (see FIG. 11), and hence the periodic number (the number of waves) of the adjustment damping signal during the first adjustment damping period $P_{B3}$ is the same as the periodic number (the number of waves) of the main damping signal during the first damping period $P_{A3}$. When the voltage MV1 is changed from low level to high level at time point $t_{B3}$, the first adjustment damping period $P_{B3}$ starts. After that, when the voltage MV2 is changed from high level to low level at time point $t_{B4}$, the first adjustment damping period $P_{B3}$ ends.

Figure 18:
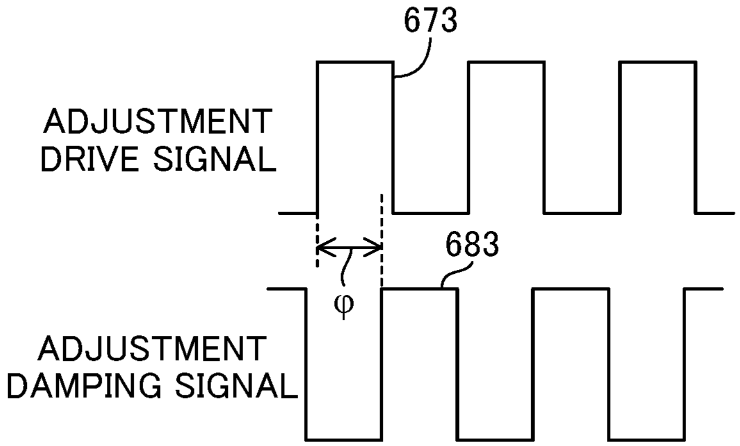
FIG. 18 is a diagram illustrating a phase relationship between the adjustment drive signal and the adjustment damping signal, according to the embodiment of the present disclosure.

FIG. 18 illustrates the waveforms 673 and 683 of the adjustment drive signal and the adjustment damping signal. The adjustment drive signal and the adjustment damping signal are not simultaneously supplied to the piezoelectric element 20, but in order to show their phase relationship, FIG. 18 illustrates the waveforms 673 and 683 of the adjustment drive signal and the adjustment damping signal in a vertically aligned manner, for convenience sake. The phase of the adjustment damping signal is a phase with respect to the phase of the adjustment drive signal. It is supposed that the phase of the adjustment damping signal is delayed from that of the adjustment drive signal, and that a phase lag of the adjustment damping signal with respect to the adjustment drive signal is the phase of the adjustment damping signal. The phase of the adjustment damping signal is also denoted by φ similarly to the phase of the main damping signal. The phase φ of the adjustment damping signal is defined by the length of the first adjustment brake period $P_{B2}$. When the length of the first adjustment brake period $P_{B2}$ is denoted by T, the phase φ of the adjustment damping signal is expressed by $\varphi=T/(1/f)\times 2\pi$ in radians expression.

The period between time points $t_{B4}$ and $t_{B5}$ is a second adjustment brake period $P_{B4}$. During the second adjustment brake period $P_{B4}$, the voltages MV1 and MV2 are both maintained at low level. The second adjustment brake period $P_{B4}$ has the same length as the second brake period $P_{A4}$ (see FIG. 11). If the second brake period $P_{A4}$ is eliminated during the normal detection operation, the second adjustment brake period $P_{B4}$ is also eliminated in the adjustment operation, and in this case, it is understood that time point $t_{B4}$ and time point $t_{B5}$ are the same time point.

The period between time points $t_{B5}$ and $t_{B7}$ is a second adjustment damping period $P_{B5}$ during which the damping circuit 140 is connected to the piezoelectric element 20. In the second adjustment damping period $P_{B5}$, the adjustment driving circuit 170 becomes high impedance state. In FIG. 15, hatching areas of waveforms of the voltages MV1 and MV2 indicate the high impedance state of the adjustment driving circuit 170. During the second adjustment damping period $P_{B5}$, the damping circuit 140 is connected to the piezoelectric element 20 via the switch circuits 160 and 150, and the output terminals DRV1 and DRV2 (specifically, the line LN12 is connected to the first terminal of the piezoelectric element 20, and the line LN22 is connected to the second terminal of the piezoelectric element 20).

In the adjustment unit operation, the voltage value $V_{EV}$ of the envelope signal is being lowered at time point $t_{B4}$ and after. Then, after time point $t_{B5}$, the voltage value $V_{EV}$ is changed from higher than a predetermined threshold value $V_{TH\_B}$ to lower than the predetermined threshold value $V_{TH\_B}$ at time point $t_{B6}$. The time period between time points $t_{B5}$ and $t_{B6}$ is specially referred to as ringing time $T_{R\_B}$. The control circuit 130 includes a comparator (not shown) that compares the voltage value $V_{EV}$ with the predetermined threshold value $V_{TH\_B}$, and detects the ringing time $T_{R\_B}$ based on a comparison result by the comparator. In the adjustment unit operation, the control circuit 130 may determine any time point after detecting the ringing time $T_{R\_B}$ as the time point $t_{B7}$.

The predetermined threshold value $V_{TH\_B}$ is determined based on a value stored in the nonvolatile memory of the storage circuit 131. In contrast, the predetermined threshold value $V_{TH\_A}$ (see FIG. 11) in the normal detection operation is set based on a command from the host block 2. However, it may be possible that the predetermined threshold value $V_{TH\_A}$ is set based on a value stored in the nonvolatile memory of the storage circuit 131. As a result, the predetermined threshold value $V_{TH\_A}$ and the predetermined threshold value $V_{TH\_B}$ may be different or equal to each other.

Hereinafter, with reference to a plurality of examples, some specific operational examples, application techniques, variation techniques, and the like related to the ultrasonic sensor 1 are described. The above description of this embodiment can be applied to the following examples unless otherwise noted and as long as no contradiction arises. In each example, if there is a contradiction with the above description, description in each example may be prioritized. Further, as long as no contradiction arises, description in any example among the plurality of examples below can be applied to any other example (i.e., any two or more examples among the plurality of examples can be combined).

First Example

Figure 19:
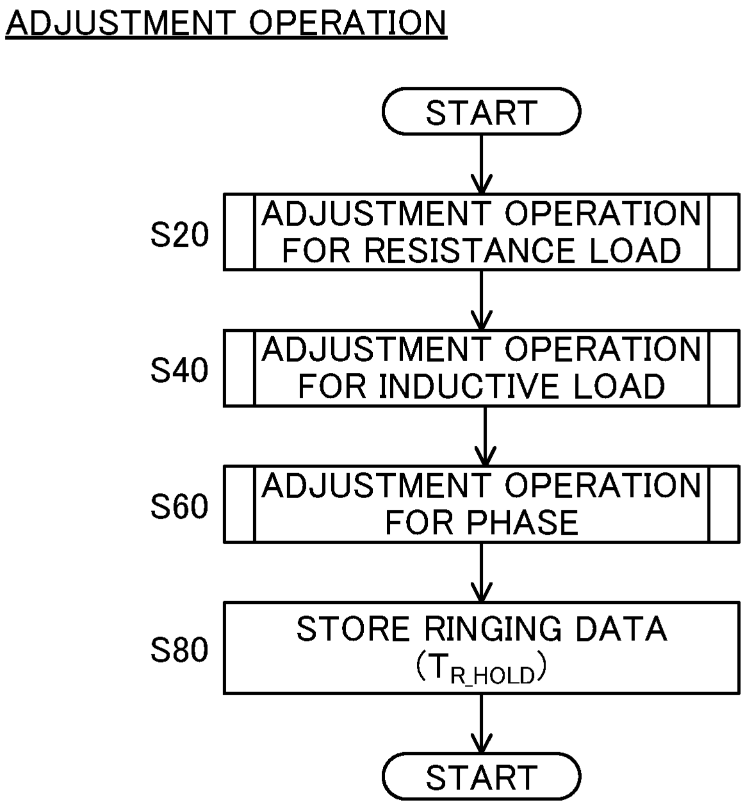
FIG. 19 is a flowchart of an adjustment operation, according to the embodiment of the present disclosure.

A first example is described. FIG. 19 illustrates a flowchart of the adjustment operation according to a first example. In the adjustment operation of FIG. 19, the adjustment operation for resistance load in Step S20, the adjustment operation for inductive load in Step S40, and the adjustment operation for phase in Step S60 are performed sequentially, and lastly the ringing data 131*c* indicating the ringing time $T_{R\_HOLD}$ (see FIG. 14) is stored in the storage circuit 131 in Step S80. A combination of processes in Steps S20, S40, S60, and S80 corresponds to a combination of Steps S2 to S4 in FIG. 13. The execution order of Steps S20, S40, and S60 can be made different from that illustrated in FIG. 19, but in the first example, it is supposed that the operations of Step S20, S40, and S60 are executed in this order.

Figure 20:
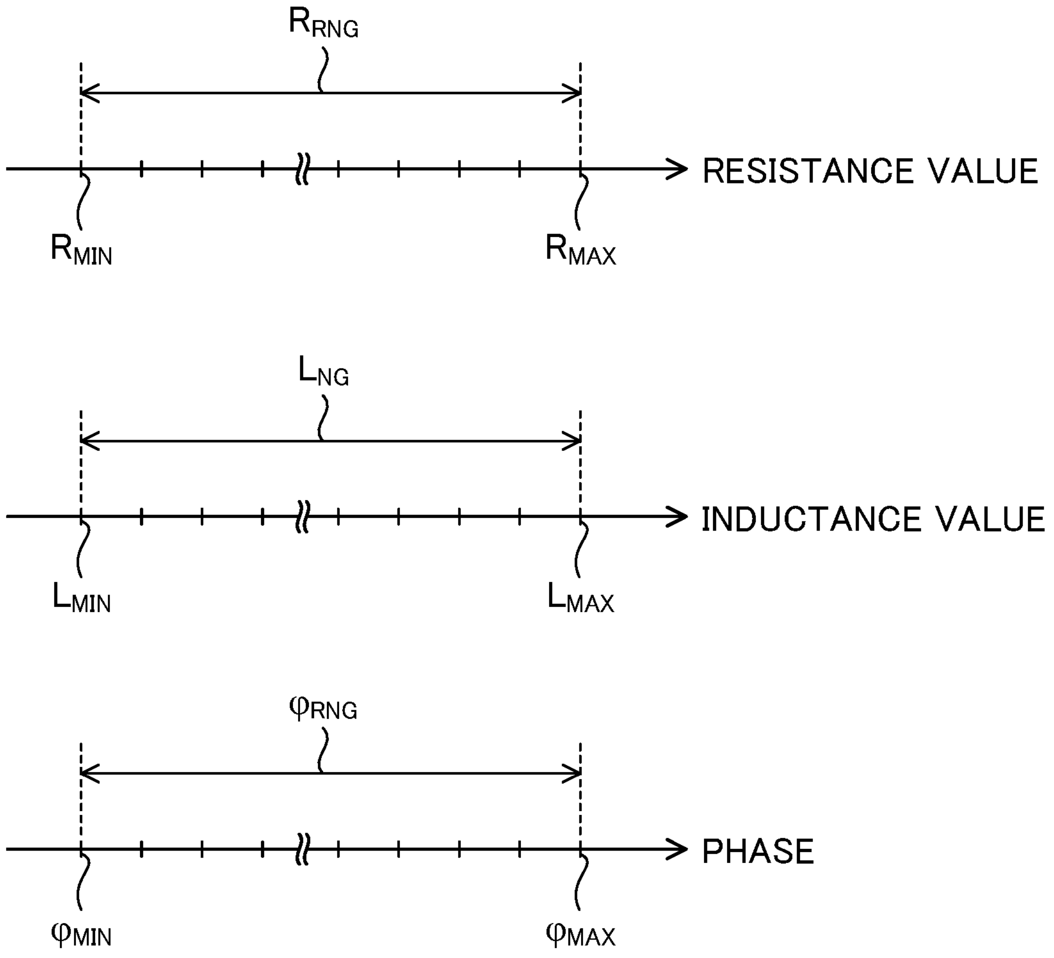
FIG. 20 is an explanatory diagram of a search range related to the adjustment operation, according to the embodiment of the present disclosure.

As illustrated in FIG. 20, a search range $R_{RNG}$ is set for the resistance value of the resistance load 141, and a search range $L_{RNG}$ is set for the inductance value of the inductive load 142. In addition, a search range $\varphi_{RNG}$ is set for the phase $\varphi$ of the main damping signal and the adjustment damping signal. Note that in the following description, when simply referred to as the phase $\varphi$, it indicates the phase of the main damping signal and the phase of the adjustment damping signal. In addition, in the following description, the resistance value of the resistance load 141 may be referred to as a resistance value R, and the inductance value of the inductive load 142 may be referred to as an inductance value L.

The search range $R_{RNG}$ is a variable range of the resistance value R from a minimum value $R_{MIN}$ to a maximum value $R_{MAX}$ ($R_{MIN}<R_{MAX}$). When the search range $R_{RNG}$ is divided into $N_R-1$ (for example, divided equally), the first to $N_R$-th candidate resistance values are set in the search range $R_{RNG}$. It is supposed that the first candidate resistance value is the minimum value R MIN while the $N_R$-th candidate resistance value is the maximum value $R_{MAX}$, and that the (j+1)th candidate resistance value is larger than the j-th candidate resistance value for any integer j. The resistance value R of the resistance load 141 can be any one of the first to $N_R$-th candidate resistance values. Therefore, the initial resistance value R INT and the set resistance value $R_{SET}$ (see FIG. 14) are each any one of the first to $N_R$-th candidate resistance values.

The search range $L_{RNG}$ is a variable range of the inductance value L from the minimum value L MIN to the maximum value $L_{MAX}$ ($L_{MIN}<L_{MAX}$). When the search range $L_{RNG}$ is divided into $N_L-1$ (for example, divided equally), the first to $N_L$-th candidate inductance values are set in the search range $L_{RNG}$. It is supposed that the first candidate inductance value is the minimum value L MIN while the $N_L$-th candidate inductance value is the maximum value $L_{MAX}$, and that the (j+1)th candidate inductance value is larger than the j-th candidate inductance value for any integer j. The inductance value L of the inductive load 142 can be any one of the first to $N_L$-th candidate inductance values. Therefore, the initial inductance value $L_{INT}$ and the set inductance value Ls ET (see FIG. 14) are each any one of the first to $N_L$-th candidate inductance values.

The search range $\varphi_{RNG}$ is a variable range of the phase $\varphi$ from a minimum phase (Nix to a maximum phase $\varphi_{MAX}$ $\varphi_{MIN}<\varphi_{MAX}$). When the search range $\varphi_{RNG}$ is divided into $N\varphi-1$ (for example, divided equally), the first to $N\varphi$-th candidate phases are set in the search range $\varphi_{RNG}$. It is supposed that the first candidate phase is the minimum phase $\varphi_{MIN}$ while the $N\varphi$-th candidate phase is the maximum phase $\varphi_{MAX}$, and that the (j+1)th candidate phase has a larger value than the j-th candidate phase for any integer j. The phase $\varphi$ of the main damping signal and the adjustment damping signal can be any one of the first to $N\varphi$-th candidate phases. Therefore, the initial phase $\varphi_{INT}$ and the set phase $\varphi_{SET}$ (see FIG. 14) are each any one of the first to $N\varphi$-th candidate phase.

Note that the search ranges $R_{RNG}$, $L_{RNG}$, and $\varphi_{RNG}$ are determined based on content stored in the storage circuit 131. $N_R$, $N_L$, and Nip described above each have a predetermined integer that is 2 or larger (for example, a few tens). The values of $N_R$, $N_L$, and $N\varphi$ may be or may not be the same. In addition, as for the resistance value R, a change between the j-th candidate resistance value and the (j+n)th candidate resistance value is referred to as shifting by n steps (j is a natural number). The same is true for the inductance value L and the phase φ. Here, n is an arbitrary integer of 1 or more.

[Adjustment Operation for Resistance Load]

Figure 21:
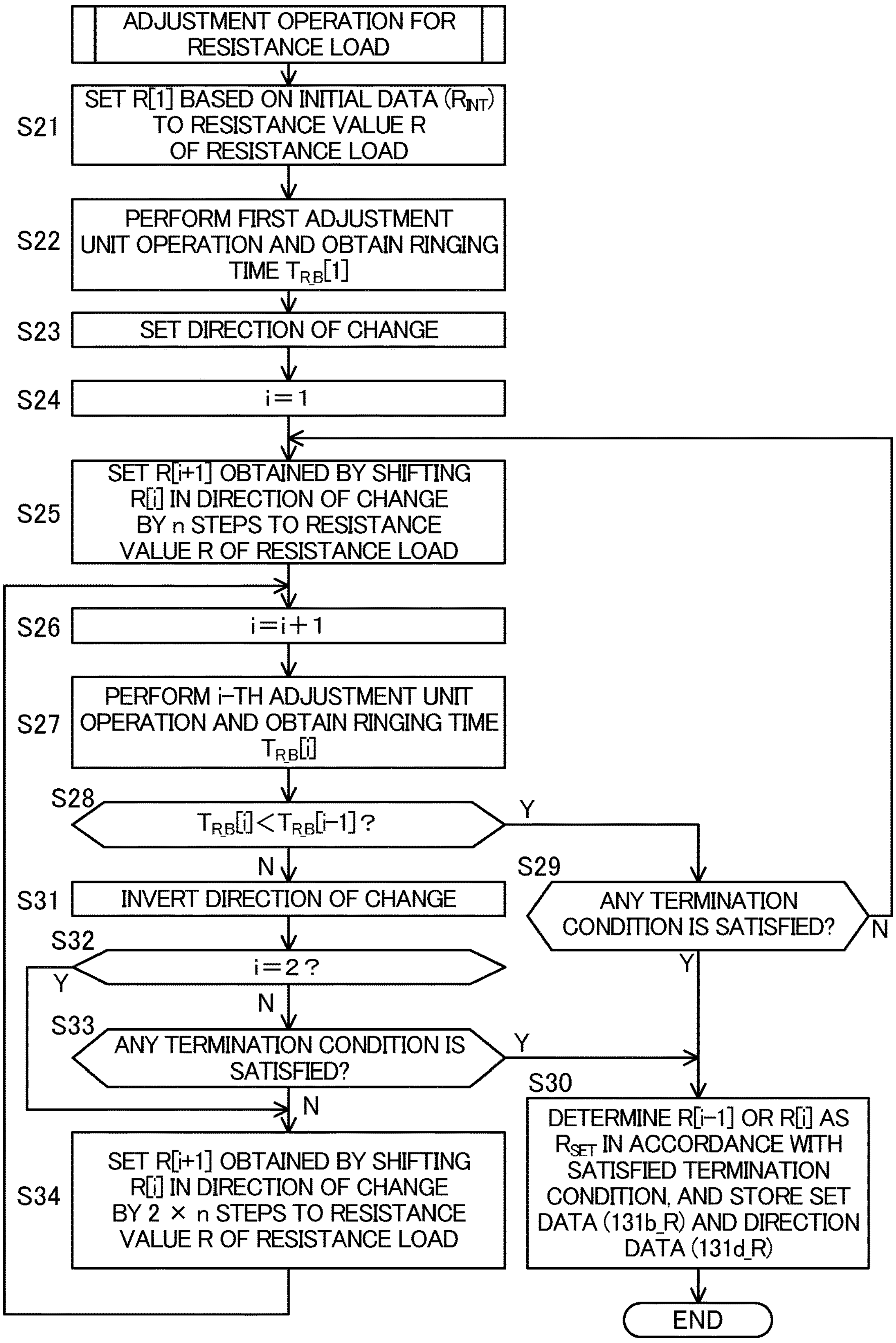
FIG. 21 is a flowchart of the adjustment operation for resistance load, according to the embodiment of the present disclosure.

FIG. 21 illustrates a flowchart of the adjustment operation for resistance load. In Step S20 of FIG. 19, the adjustment operation for resistance load illustrated in FIG. 21 can be performed. The adjustment operation for resistance load starts from the process in Step S21. In Step S21, the control circuit 130 refers to the storage circuit 131 (see FIG. 14), and sets the initial resistance value $R_{INT}$ as a resistance value R[1] to the resistance value R of the resistance load 141. Further, the control circuit 130 sets the initial inductance value $L_{INT}$ and the initial phase $\varphi_{INT}$ to the inductance value L and phase φ, respectively. However, when the execution order of Steps S20, S40, and S60 illustrated in FIG. 19 is exchanged, if the adjustment operation for inductive load is already performed before the adjustment operation for resistance load, the set inductance value $L_{SET}$ may be set for the inductance value L. Similarly, if the adjustment operation for phase is already performed before the adjustment operation for resistance load, the set phase $\varphi_{SET}$ may be set for the phase φ.

In Step S22 after Step S21, the control circuit 130 performs the first adjustment unit operation, and obtains the ringing time $T_{R\_B}$ measured in the first adjustment unit operation, as a ringing time $T_{R\_B}$[1]. After that, in Step S23, the control circuit 130 sets direction of change. In this case, if FLG=0 holds (see FIG. 13), a positive direction is set to the direction of change. However, even if FLG=0 holds, if the resistance value R[1] is equal to the maximum value $R_{MAX}$, or if the resistance value when shifting the resistance value R[1] by n steps in the positive direction exceeds the search range $R_{RNG}$, a negative direction is set to the direction of change. If FLG=1 holds, the direction opposite to the direction of change indicated by the direction data 131*d*_R is the direction of change to be set in Step S23 (meaning of this will be clarified later). Note that the positive direction means a direction in which a value is increased, and the negative direction means a direction in which a value is decreased.

After Step S23, the control circuit 130 substitutes 1 into the variable i in Step S24, and the process proceeds to Step S25. In Step S25, the control circuit 130 shifts a resistance value R[i] in the set direction of change by n steps so as to determine a resistance value R[i+1], and sets the resistance value R[i+1] to the resistance value R of the resistance load 141. After Step S25, the control circuit 130 adds 1 to the variable i in Step S26. After that, in Step S27, the control circuit 130 performs the i-th adjustment unit operation, and obtains the ringing time $T_{R\_B}$ measured in the i-th adjustment unit operation, as a ringing time $T_{R\_B}$[i]. Next, in Step S28, the control circuit 130 determines whether or not the inequality $T_{R\_B}[i]<T_{R\_B}[i-1]$ is satisfied. In other words, it determines whether or not the ringing time $T_{R\_B}$[i] of this time is smaller than the ringing time $T_{R\_B}$[i−1] of the last time. If the inequality $T_{R\_B}[i]<T_{R\_B}[i-1]$ is satisfied in Step S28, the process proceeds to Step S29, and otherwise the process proceeds to Step S31.

In Step S29, the control circuit 130 determines whether or not any one of termination conditions is satisfied. The termination conditions include first to third termination conditions, which will be described later. If any one of termination conditions is satisfied in Step S29, the process proceeds to Step S30. If no termination condition is satisfied, the process returns to Step S25, and the processes in Step S25 and after are repeated. In Step S31, the control circuit 130 inverts the direction of change set in Step S23. When reaching Step S31, the direction of change of the resistance value R after that is the inverted direction of change. In Step S32 after Step S31, the control circuit 130 determines whether or not i=2 is satisfied. If i=2 is satisfied, the process proceeds from Step S32 to Step S34. If i=2 is not satisfied, the process proceeds from Step S32 to Step S33. In Step S33, the control circuit 130 determines whether or not any one of termination conditions is satisfied. In Step S33, if any one of termination conditions is satisfied, the process proceeds to Step S30. If no termination condition is satisfied, the process proceeds to Step S34. In Step S34, the control circuit 130 shifts the resistance value R[i] in the set direction of change (in the inverted direction of change) by 2×n steps so as to determine the resistance value R[i+1], and sets the resistance value R[i+1] to the resistance value R of the resistance load 141. After Step S34, the process returns to Step S26.

In Step S30, the control circuit 130 determines (substitutes) the resistance value R[i−1] or R[i] as (into) the set resistance value $R_{SET}$ according to the termination condition satisfied in Step S29 or S33, and stores the set data 131*b*_R indicating the set resistance value $R_{SET}$ in the storage circuit 131, and stores the direction data 131*d*_R corresponding to the resistance value R in the storage circuit 131. When reaching Step S30 without passing through Step S31, the direction data 131*d*_R to be stored indicates the positive direction. When reaching Step S30 via Step S31, the direction data 131*d*_R to be stored indicates the negative direction. When finishing the process in Step S30, the adjustment operation for resistance load is finished, and after that, in the normal detection operation, the control circuit 130 controls the damping circuit 140 in such a manner that the resistance value R of the resistance load 141 has the set resistance value $R_{SET}$ in the set data 131*b*_R.

Figure 22:
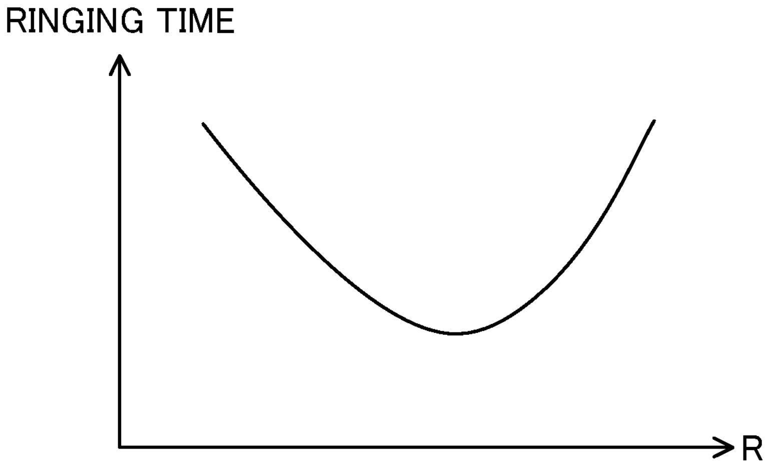
FIG. 22 is a diagram illustrating an example of a relationship between a resistance value of a resistance load and a ringing time, according to the embodiment of the present disclosure.

With reference to some patterns as examples, technical meanings of the adjustment operation for resistance load are described. When using the resistance load 141 for reducing the reverberation, the reverberation time including the ringing time varies depending on the resistance value R of the resistance load 141. As illustrated in FIG. 22, it can be regarded that the ringing time simply decreases to have the minimum value and then simply increases, while the resistance value R increases.

Figure 23:
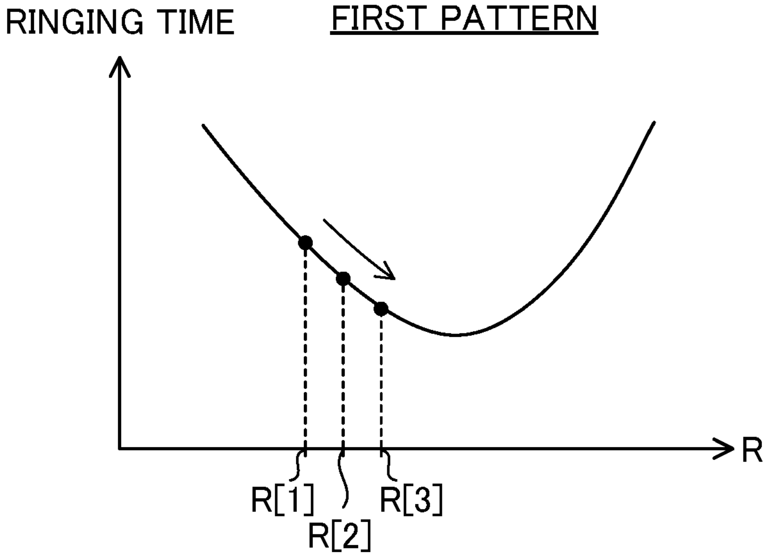
FIG. 23 is a diagram for describing a flow of a first pattern related to the adjustment operation for resistance load, according to the embodiment of the present disclosure.

In a first pattern illustrated in FIG. 23, when the resistance value R increases (from R[1] to R[2]), the ringing time is decreased. In this case, the resistance value R to be the set resistance value $R_{SET}$ is searched for until the termination condition is satisfied, while maintaining the direction of change in the positive direction. The first pattern corresponds to the pattern in which after Steps S21 to S29 in FIG. 21, Steps S25 to S29 are repeated once or more, and then the process proceeds to Step S30. Note that in FIG. 23 and FIGS. 24 to FIG. 27 described later, it is supposed that the direction of change is set to the positive direction in Step S23.

Figure 24:
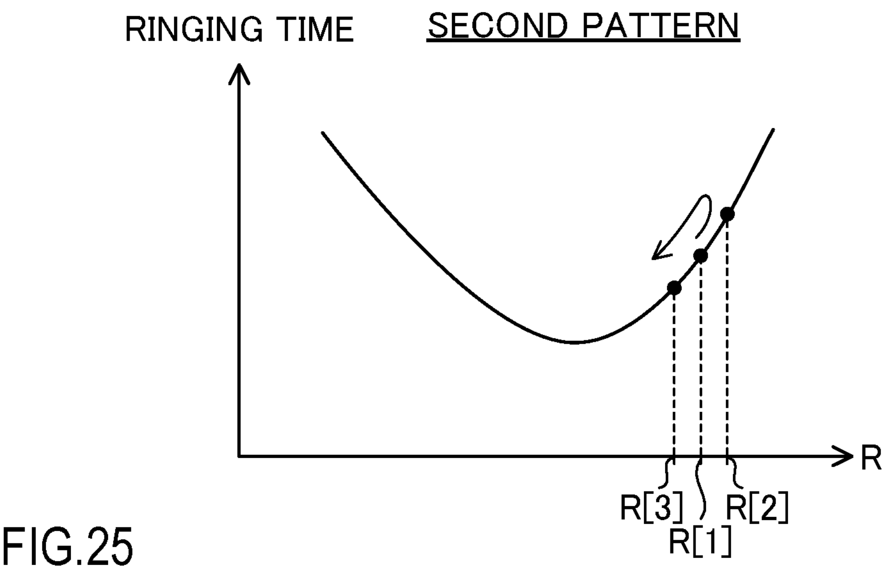
FIG. 24 is a diagram for describing a flow of a second pattern related to the adjustment operation for resistance load, according to the embodiment of the present disclosure.

In a second pattern illustrated in FIG. 24, the ringing time is increased due to the increase of the resistance value R from the resistance value R[1] to the resistance value R[2]. In this case, after Steps S21 to S28 in FIG. 21, the process proceeds to Step S31 in which the direction of change is switched to the negative direction. After that, the resistance value R that is most suitable for reducing the ringing time is searched for, while changing the resistance value R in the negative direction. Note that after the shifting operation by 2×n steps in Step S34, in the second pattern, a resistance value R[3] is obtained as a result of shifting the resistance value R[2] by 2×n steps in the negative direction. In addition, in the second pattern, if the termination condition (the second termination condition corresponding to FIG. 26 described later) is quickly satisfied after obtaining a ringing time $T_{R\_B}$ [2] corresponding to the resistance value R[2], and the process proceeds to Step S30, the opportunity for searching for in the negative direction is lost. In order to avoid the loose of this opportunity, the branching process in Step S32 is provided.

Figure 25:
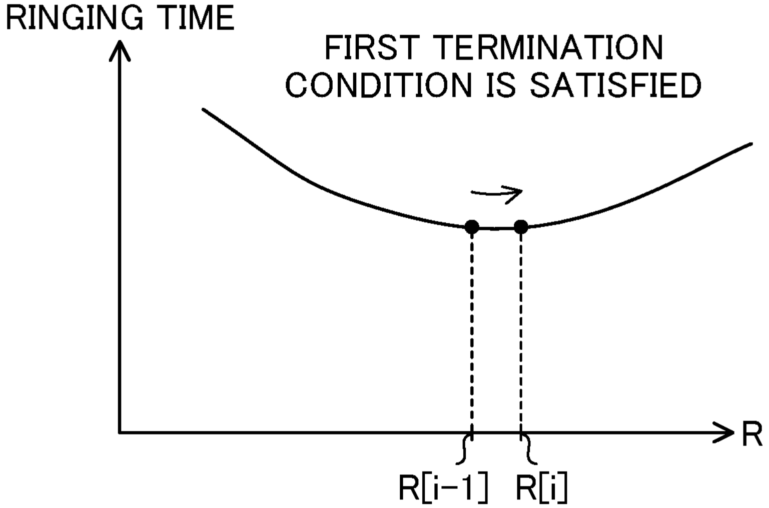
FIG. 25 is a diagram for describing a first termination condition related to the adjustment operation for resistance load, according to the embodiment of the present disclosure.

With reference to FIG. 25, the first termination condition is described. The first termination condition is satisfied if the change amount of the ringing time does not exceed a predetermined time $T_{TH1}$ (for example, 40μ seconds) when the resistance value R is changed from the resistance value R[i−1] to the resistance value R[i]. In other words, if an absolute value of $T_{R\_B}$[i]−$T_{R\_B}$[i−1] is the predetermined time $T_{TH1}$ or less, the first termination condition is satisfied. It is because the change of the ringing time due to the change of the resistance value R is considered to be small near the minimum value of the ringing time. When the first termination condition is satisfied so as to reach Step S30, the control circuit 130 compares the ringing time $T_{R\_B}$[i] with $T_{R\_B}$[i−1]. If $T_{R\_B}$[i]$T_{R\_B}$[i−1] is satisfied, it determines (substitutes) the resistance value R[i−1] as (into) the set resistance value $R_{SET}$. If $T_{R\_B}[1]<T_{R\_B}$[i−1] is satisfied, it determines (substitutes) the resistance value R[i] as (into) the set resistance value $R_{SET}$.

Figure 26:
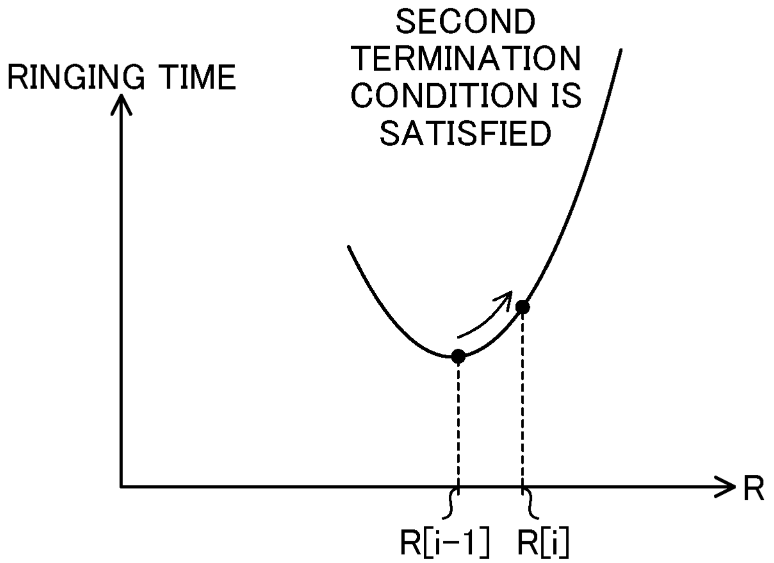
FIG. 26 is a diagram for describing a second termination condition related to the adjustment operation for resistance load, according to the embodiment of the present disclosure.

With reference to FIG. 26, the second termination condition is described. The second termination condition is satisfied if the change of the ringing time exceeds the predetermined time $T_{TH1}$ (for example, 40μ seconds), when the resistance value R is changed from the resistance value R[i−1] to the resistance value R[i]. In other words, if $T_{R\_B}$[i]-$T_{R\_B}$[i−1]$T_{TH1}$ is satisfied, the second termination condition is satisfied. Considering the individual variation of the piezoelectric element 20, ambient temperature of the ultrasonic sensor 1, and the like, there may be a case where the ringing time is rapidly increased with respect to a constant change of the resistance value R, when the ringing time is close to its minimum. The second termination condition supports this case. If $T_{R\_B}$[1]-$T_{R\_B}$[i−1] $T_{TH1}$ is satisfied so that the second termination condition is satisfied, the resistance value R[i−1] is determined as (substituted into) the set resistance value $R_{SET}$.

Figure 27:
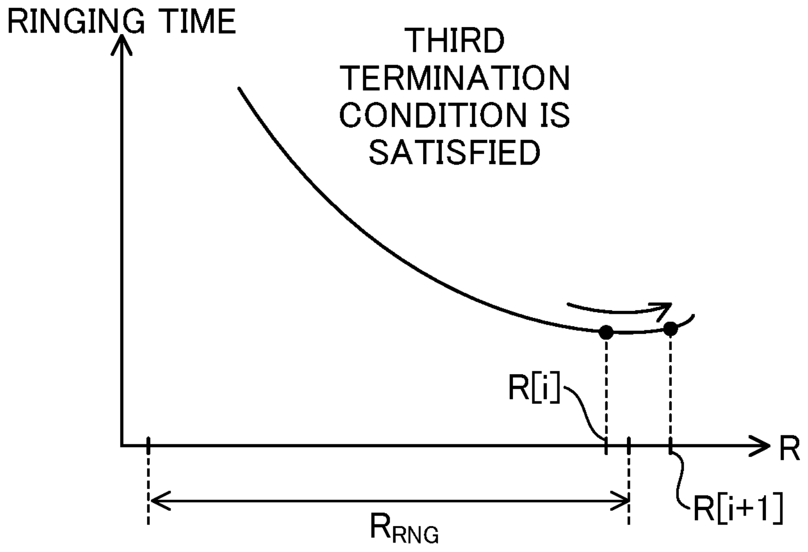
FIG. 27 is a diagram for describing a third termination condition related to the adjustment operation for resistance load, according to the embodiment of the present disclosure.

With reference to FIG. 27, the third termination condition is described. In Step S25 or S34, the resistance value R is updated from the resistance value R[i] to the resistance value R[i+1], and if the updated resistance value R exceeds the search range $R_{RNG}$ (i.e., if the updated resistance value R does not belong to the search range $R_{RNG}$), the third termination condition is satisfied. If the third termination condition is satisfied, the resistance value R[i] that is the resistance value before the update is determined as (substituted into) the set resistance value $R_{SET}$.

In this way, in the adjustment operation for resistance load, the control circuit 130 performs the adjustment unit operation a plurality of times while switching the resistance value R of the resistance load 141 by a plurality of steps, so as to obtain a plurality of the ringing times $T_{R\_B}$, and specifies the minimum ringing time $T_{R\_B}$ among the plurality of the obtained ringing times $T_{R\_B}$. Then, the control circuit 130 can determine the candidate resistance value corresponding to the minimum ringing time $T_{R\_B}$ as the set resistance value $R_{SET}$, among the first to $N_R$-th candidate resistance values (see FIG. 20).

In the adjustment operation for resistance load, the adjustment target is the resistance value R of the resistance load 141, and the set resistance value $R_{SET}$ for the resistance load 141 is determined in the adjustment operation for resistance load. After that, in the normal detection operation, the resistance value R of the resistance load 141 is the set resistance value $R_{SET}$. In contrast, in the adjustment operation for inductive load, the adjustment target is the inductance L of the inductive load 142, and the set inductance value $L_{SET}$ for the inductive load 142 is determined in the adjustment operation for inductive load. After that, in the normal detection operation, the inductance value L of the inductive load 142 is the set inductance value $L_{SET}$. Similarly, in the adjustment operation for phase, the adjustment target is the phase φ (that is the phase of the main damping signal and is also the phase of the adjustment damping signal), and the set phase $\varphi_{SET}$ for the phase φ is determined in the adjustment operation for phase. After that, in the normal detection operation, the phase φ of the main damping signal is the set phase $\varphi_{SET}$. In this way, the adjustment operation for inductive load and the adjustment operation for phase are different from the adjustment operation for resistance load only in the adjustment target. Except for this difference, each of the adjustment operation for inductive load and the adjustment operation for phase is basically the same as the adjustment operation for resistance load. However, there are some other differences, and hence in the following description, flows of the adjustment operation for inductive load and the adjustment operation for phase are further described.

[Adjustment Operation for Inductive Load]

Figure 28:
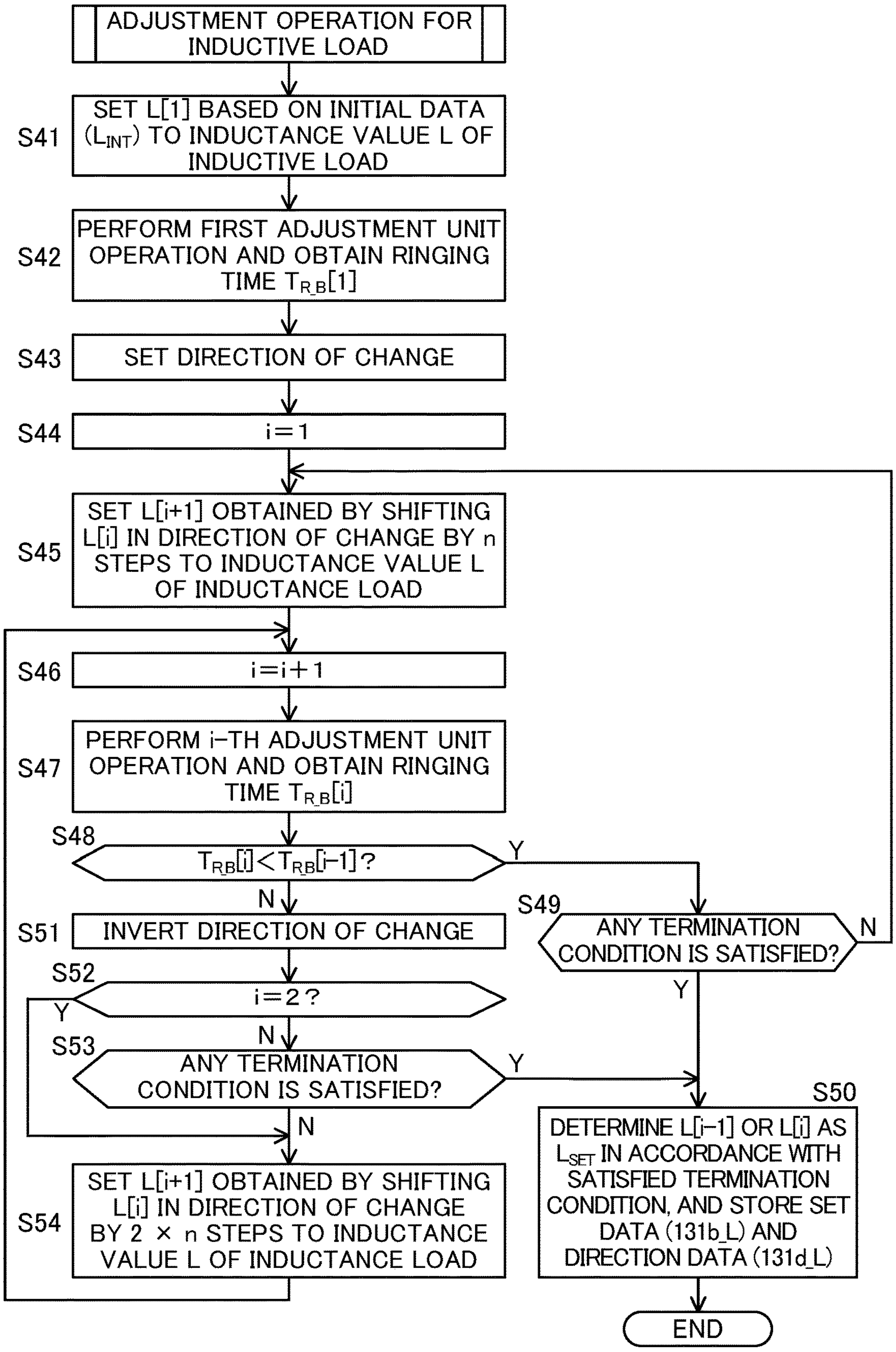
FIG. 28 is a flowchart of the adjustment operation for inductive load, according to the embodiment of the present disclosure.

FIG. 28 illustrates a flowchart of the adjustment operation for inductive load. In Step S40 of FIG. 19, the adjustment operation for inductive load illustrated in FIG. 28 can be performed. The adjustment operation for inductive load starts from the process in Step S41. In Step S41, the control circuit 130 refers to the storage circuit 131 (see FIG. 14), so as to set the initial inductance value $L_{INT}$ as an inductance value L[1] to the inductance value L of the inductive load 142. Further, the control circuit 130 sets the initial phase $\varphi_{INT}$ to the phase φ, and sets the set resistance value $R_{SET}$ obtained in Step S20 to the resistance value R. However, it may be possible to set the initial resistance value $R_{INT}$ to the resistance value R as a variation. In particular, for example, if the adjustment operation for inductive load is performed without performing the adjustment operation for resistance load, unlike the operation flow of FIG. 19, the initial resistance value R INT is set to the resistance value R in Step S41.

In Step S42 after Step S41, the control circuit 130 performs the first adjustment unit operation, and obtains the ringing time $T_{R\_B}$ measured in the first adjustment unit operation, as the ringing time $T_{R\_B}$[1]. After that, in Step S43 the control circuit 130 sets the direction of change. In this case, if FLG=0 (see FIG. 13) holds, the positive direction is set to the direction of change. However, even if FLG=0 holds, if the inductance value L[1] is equal to the maximum value $L_{MAX}$, or if the inductance value when the inductance value L[1] is shifted in the positive direction by n steps exceeds the search range $L_{RNG}$, the negative direction is set to the direction of change. If FLG=1 holds, the opposite to the direction of change indicated by the direction data 131*d*_L is set as the direction of change to be set in Step S43 (this meaning will be clear later).

After Step S43, the control circuit 130 substitutes 1 into the variable i in Step S44, and the process proceeds to Step S45. In Step S45, the control circuit 130 shifts an inductance value L[i] in the set direction of change by n steps so as to determine an inductance value L[i+1], and sets the inductance value L[i+1] to the inductance value L of the inductive load 142. In the Step S46 after Step S45, the control circuit 130 adds 1 to the variable i. After that, in Step S47, the control circuit 130 performs the i-th adjustment unit operation, and obtains the ringing time $T_{R\_B}$ measured in the i-th adjustment unit operation as the ringing time $T_{R\_B}$[i]. After that, in Step S48, the control circuit 130 determines whether or not the inequality $T_{R\_B}$ [1]<$T_{R\_B}$ [i−1] is satisfied. In Step S48, if the inequality $T_{R\_B}$[i]<$T_{R\_B}$[i−1] is satisfied, the process proceeds to Step S49, and otherwise the process proceeds to Step S51.

In Step S49, the control circuit 130 determines whether or not any one of termination conditions is satisfied. In Step S49, if any one of termination conditions is satisfied, the process proceeds to Step S50. If no termination condition is satisfied, the process returns to Step S45, and the processes of Step S45 and after are repeated. In Step S51, the control circuit 130 inverts the direction of change set in Step S43. When reaching Step S51, the direction of change of the inductance value L after that is the inverted direction of change. In Step S52 after Step S51, the control circuit 130 determines whether or not i=2 is satisfied. If i=2 is satisfied, the process proceeds from Step S52 to Step S54. If i=2 is not satisfied, the process proceeds from Step S52 to Step S53. In Step S53, the control circuit 130 determines whether or not any one of termination conditions is satisfied. In Step S53, if any one of termination conditions is satisfied, the process proceeds to Step S50. If no termination condition is satisfied, the process proceeds to Step S54. In Step S54, the control circuit 130 shifts the inductance value L[i] in the set direction of change (the inverted direction of change) by 2×n steps so as to determine the inductance value L[i+1], and sets the inductance value L[i+1] to the inductance value L of the inductive load 142. After Step S54, the process returns to Step S46.

In Step S50, the control circuit 130 determines (substitutes) the inductance value L[i−1] or L[i] as (into) the set inductance value $L_{SET}$ in accordance with the termination condition satisfied in Step S49 or S53, stores the set data 131*b*_L indicating the set inductance value $L_{SET}$ in the storage circuit 131, and stores the direction data 131*d*_L corresponding to inductance value L in the storage circuit 131. When reaching Step S50 without passing through Step S51, the stored direction data 131*d*_L indicates the positive direction. When reaching Step S50 via Step S51, the stored direction data 131*d*_L indicates the negative direction. When the process in Step S50 is finished, the adjustment operation for inductive load is finished. After that, in the normal detection operation, the control circuit 130 controls the damping circuit 140 so that the inductance value L of the inductive load 142 has the set inductance value $L_{SET}$ in the set data 131*b*_L.

The content of the termination condition in the adjustment operation for inductive load is the same as that in the adjustment operation for resistance load, and the content of the termination condition described above for the adjustment operation for resistance load is also applied to the adjustment operation for inductive load. When it is applied, the resistance values R, R[1], R[2], R[3], R[i−1], R[i], R[i+1], and $R_{SET}$ in the description of the adjustment operation for resistance load should be read as the inductance values L, L[1], L[2], L[3], L[i−1], L[i], L[i+1], and $L_{SET}$, respectively. Furthermore, Steps S21 to S34 in the description of the adjustment operation for resistance load should be read as Steps S41 to S54, respectively.

In this way, in the adjustment operation for inductive load, the control circuit 130 performs the adjustment unit operation a plurality of times while changing the inductance value L of the inductive load 142 by a plurality of steps, so as to obtain a plurality of the ringing times $T_{R\_B}$, and specifies the minimum ringing time $T_{R\_B}$ among the plurality of the obtained ringing times $T_{R\_B}$. Then, the control circuit 130 can determine the candidate inductance value corresponding to the minimum ringing time $T_{R\_B}$ among the first to $N_L$-th candidate inductance values (see FIG. 20), as the set inductance value $L_{SET}$.

[Adjustment Operation for Phase]

Figure 29:
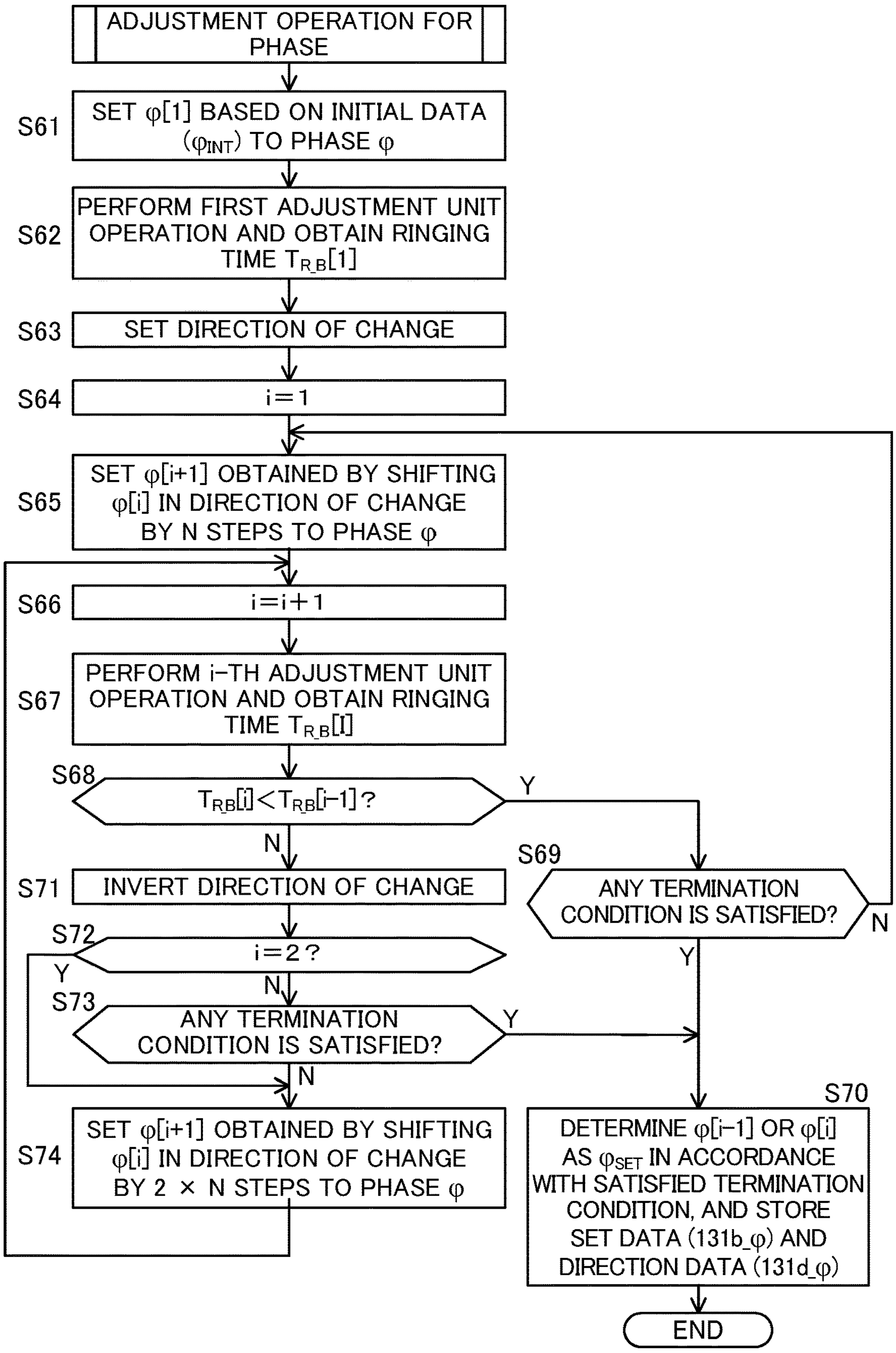
FIG. 29 is a flowchart of the adjustment operation for phase, according to the embodiment of the present disclosure.

FIG. 29 illustrates a flowchart of the adjustment operation for phase. In Step S60 of FIG. 19, the adjustment operation for phase illustrated in FIG. 29 can be performed. The adjustment operation for phase starts from the process in Step S61. In Step S61, the control circuit 130 refers to the storage circuit 131 (see FIG. 14), and sets the initial phase $\varphi_{INT}$ as the phase φ[1] to the phase φ of the adjustment damping signal. Furthermore, the control circuit 130 sets the set resistance value $R_{SET}$ obtained in Step S20 to the resistance value R, and sets the set inductance value $L_{SET}$ obtained in Step S40 to the inductance value L. However, it may be possible to set the initial resistance value $R_{INT}$ to the resistance value R as a variation, or to set the initial inductance value $L_{INT}$ to the inductance value L as another variation. In particular, for example, if the adjustment operation for phase is performed without performing the adjustment operation for resistance load, unlike the operation flow of FIG. 19, the initial resistance value R INT is set to the resistance value R in Step S61. Similarly, if the adjustment operation for phase is performed without performing the adjustment operation for inductive load, the initial inductance value $L_{INT}$ is set to the inductance value L in Step S61.

In Step S62 after Step S61, the control circuit 130 performs the first adjustment unit operation, and obtains the ringing time $T_{R\_B}$ measured in the first adjustment unit operation, as the ringing time $T_{R\_B}$[1]. After that, in Step S63, the control circuit 130 sets the direction of change. In this case, if FLG=0 (see FIG. 13) holds, the positive direction is set to the direction of change. However, even if FLG=0 holds, if the phase φ[1] is equal to the maximum phase $\varphi_{MAX}$, or if the phase when the phase φ[1] is shifted in the positive direction by n steps exceeds the search range $\varphi_{RNG}$, the negative direction is set to the direction of change. If FLG=1 holds, the opposite to the direction of change indicated by the direction data 131*d*_φ is set as the direction of change to be set in Step S63 (this meaning will be clear later).

After Step S63, in Step S64, the control circuit 130 substitutes 1 into the variable i, and the process proceeds to Step S65. In Step S65, the control circuit 130 shifts the phase φ[i] in the set direction of change by n steps so as to determine the phase φ[i+1], and sets the phase φ[i+1] to the phase φ of the adjustment damping signal. In Step S66 after Step S65, the control circuit 130 adds 1 to the variable i. After that, in Step S67, the control circuit 130 performs the i-th adjustment unit operation, and obtains the ringing time $T_{R\_B}$ measured in the i-th adjustment unit operation, as the ringing time $T_{R\_B}$[i]. In next Step S68, the control circuit 130 determines whether or not the inequality $T_{R\_B}$ [1] <$T_{R\_B}$ [i−1] is satisfied. In Step S68, if the inequality $T_{R\_B}$ [1]<$T_{R\_B}$ [14] is satisfied, the process proceeds to Step S69, and otherwise the process proceeds to Step S71.

In Step S69, the control circuit 130 determines whether or not any one of termination conditions is satisfied. In Step S69, if any one of termination conditions is satisfied, the process proceeds to Step S70, but if no termination condition is satisfied, the process returns to Step S65, and the processes in Step S65 and after are repeated. In Step S71, the control circuit 130 inverts the direction of change set in Step S63. When reaching Step S71, the direction of change of the phase φ after that is the inverted direction of change. In Step S72 after Step S71, the control circuit 130 determines whether or not i=2 is satisfied. If i=2 is satisfied, the process proceeds from Step S72 to Step S74. If i=2 is not satisfied, the process proceeds from Step S72 to Step S73. In Step S73, the control circuit 130 determines whether or not any one of termination conditions is satisfied. In Step S73, if any one of termination conditions is satisfied, the process proceeds to Step S70, but if no termination condition is satisfied, the process proceeds to Step S74. In Step S74, the control circuit 130 shifts the phase φ[i] in the set direction of change (inverted direction of change) by 2×n steps, so as to determine the phase φ[i+1], and sets the phase φ[i+1] to the phase φ of the adjustment damping signal. After Step S74, the process returns to Step S66.

In Step S70, the control circuit 130 determines (substitutes) the phase φ[i−1] or φ[i] as (into) the set phase $φ_{SET}$ in accordance with the termination condition satisfied in Step S69 or S73, stores the set data 131*b*_φ indicating the set phase $φ_{SET}$ in the storage circuit 131, and stores the direction data 131*d*_φ corresponding to the phase φ in the storage circuit 131. When reaching Step S70 without passing through Step S71, the stored direction data 131*d*_φ indicates the positive direction. When reaching Step S70 via Step S71, the stored direction data 131*d*_φ indicates the negative direction. When the process in Step S70 is finished, the adjustment operation for phase is finished. After that, in the normal detection operation, the control circuit 130 controls the driving circuit 111 via the gate driver 112 so that the phase φ of the main damping signal has the set phase $φ_{SET}$ in the set data 131*b*_φ (in other words, it controls the length of the first brake period $P_{A2}$ in FIG. 11).

The content of the termination condition in the adjustment operation for phase is the same as that in the adjustment operation for resistance load, the content of the termination condition described above for the adjustment operation for resistance load is also applied to the adjustment operation for phase. When it is applied, the resistance values R, R[1], R[2], R[3], R[i−1], R[i], R[i+1], and $R_{SET}$ in the description of the adjustment operation for resistance load should be read as the phases φ, φ[1], φ[2], φ[3], φ[i−1], φ[i], (p[i+1], and $φ_{SET}$, respectively. Further, Steps S21 to S34 in the description of the adjustment operation for resistance load should be read as Steps S61 to S74, respectively.

In this way, in the adjustment operation for phase, the control circuit 130 performs the adjustment unit operation a plurality of times while changing the phase φ of the adjustment damping signal by a plurality of steps, so as to obtain a plurality of the ringing times $T_{R\_B}$, and specifies the minimum ringing time $T_{R\_B}$ among a plurality of the obtained ringing times $T_{R\_B}$. Then, the control circuit 130 can determine the candidate phase corresponding to the minimum ringing time $T_{R\_B}$ among the first to Nφ-th candidate phases (see FIG. 20), as the set phase $φ_{SET}$.

[Retention of Ringing Time $T_{R\_HOLD}$]

The ringing data 131*c* to be stored in Step S80 of FIG. 19 is described. An optimized state is a state where the resistance value R of the resistance load 141 is made equal to the set resistance value $R_{SET}$, and the inductance value L of the inductive load 142 is made equal to the set inductance value $L_{SET}$, and the phase φ of the adjustment damping signal is made equal to the set phase $φ_{SET}$. The ringing time $T_{R\_HOLD}$ indicated by the ringing data 131*c* is the ringing time $T_{R\_B}$ obtained in the adjustment unit operation in the optimized state. If the adjustment operations in Steps S20, S40, and S60 are performed in the order illustrated in FIG. 19, when reaching Step S70 of FIG. 29, the ringing time $T_{R\_B}$ in the optimized state is already obtained. However, it may be possible to obtain the ringing time $T_{R\_B}$ in the optimized state in Step S80. In any case, the control circuit 130 stores the ringing data 131*c* indicating the ringing time $T_{R\_HOLD}$ in the storage circuit 131 in Step S80.

[About Restart Condition]

Figure 30:
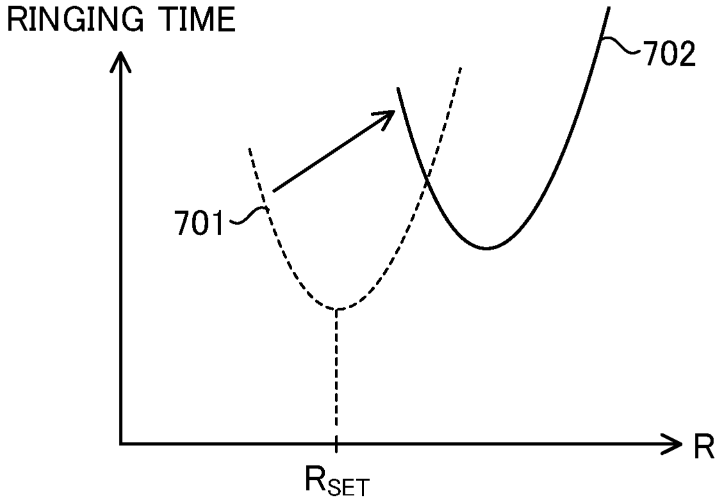
FIG. 30 is a diagram for describing a restart condition, according to the embodiment of the present disclosure.

The restart condition mentioned in the description of FIG. 13 is described. The optimized state in the adjustment operation may be changed to a state that cannot be said to be optimal in the normal detection operation, due to temperature variation or the like after that. As an example of this variation, FIG. 30 illustrates a variation from a broken line waveform 701 to a solid line waveform 702. In order to support this variation, as described above (see FIG. 13), after changing to the normal detection operation, the ringing time $T_{R\_A}$ is measured and obtained for each detection unit operation, and it is determined in Step S7 of FIG. 13 whether or not the restart condition is satisfied. In Step S7, the control circuit 130 compares the latest ringing time $T_{R\_A}$ obtained in Step S6 with the ringing time $T_{R\_HOLD}$ in the ringing data 131*c*. If the latest ringing time $T_{R\_A}$ is longer than the ringing time $T_{R\_HOLD}$ by a predetermined time TTH2 or more (i.e., if $T_{R\_A}$-$T_{R\_HOLD}$≥$T_{TH2}$ is satisfied), it is determined that the restart condition is satisfied.

If the restart condition is satisfied, as described above, 1 is set to the flag FLG in Step S8, and the process returns to Step S2, in which the adjustment operation is performed again. Performing the adjustment operation again, the resistance value R, the inductance value L, and the phase φ, which are optimal for the ultrasonic sensor 1 at present, are searched for again, and then the state advantageous for reducing the reverberation time is restored.

As described above, there is a case where the adjustment operation for resistance load is finished when the third termination condition illustrated in FIG. 27 is satisfied. In this case, when the restart condition is satisfied after that and the second adjustment operation is performed, it is preferred to set the direction of change to the opposite to the direction when the first adjustment operation is finished, and to search for an appropriate resistance value R to be the set resistance value $R_{SET}$. Considering this, in the adjustment operation for resistance load, the direction data 131*d*_R indicating the direction of change at that time is stored in Step S30 (see FIG. 21). In the adjustment operation for resistance load that is performed again, the direction data 131*d*_R is referred to, and the direction of change is set (Step S23). The same is true for the adjustment operation for inductive load and the adjustment operation for phase.

Second Example

A second example is described. In the first example, the resistance value R, the inductance value L, and the phase φ are the first, second, and third adjustment targets, and all the set resistance value $R_{SET}$, the set inductance value $L_{SET}$, and the set phase $φ_{SET}$ are determined for the first to third adjustment targets. However, it may be possible to set only any one or two of the resistance value R, the inductance value L, and the phase φ, as the adjustment target. In other words, the control circuit 130 may only perform any one or two of the adjustment operation for resistance load, the adjustment operation for inductive load, and the adjustment operation for phase. For instance, if the resistance value R appropriate for reducing the reverberation time (reducing the ringing time) is known in advance, the adjustment operation for resistance load may not be performed.

Third Example

A third example is described. In the third example, application techniques, variation techniques, supplementary notes, and the like for the techniques described above are described.

Figure 31:
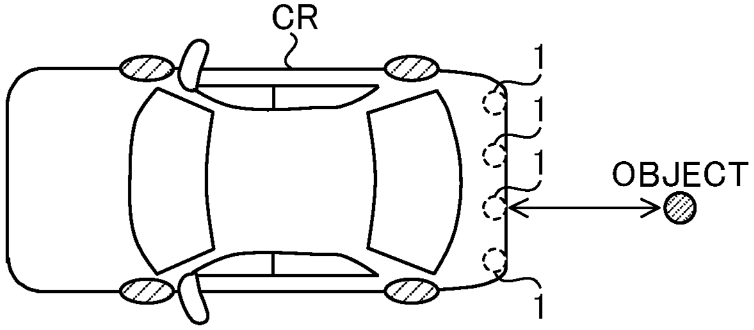
FIG. 31 is a schematic top view of a vehicle equipped with a plurality of ultrasonic sensors, according to the embodiment of the present disclosure.

The ultrasonic sensor 1 can be mounted in any device. For instance, as illustrated in FIG. 31, one or more ultrasonic sensors 1 may be disposed in a vehicle CR such as an automobile. In the example of FIG. 31, four ultrasonic sensors 1 are mounted on the rear part of the body of the vehicle CR. Using the ultrasonic sensors 1, it is possible to perform the distance detection process and the proximity detection process for an object that can exist in rear of the vehicle CR (an example of the detection object OBJ in FIG. 1). In this case, the host block 2 may be an electronic control unit (ECU) mounted in the vehicle CR.

As the driving circuit that supplies the main drive signal to the piezoelectric element 20, the driving circuit 111 constituted of a full bridge circuit is described above, but a transformer may be used to constitute the driving circuit. A structure and operation of the driving circuit using a transformer is well known, and hence description thereof is omitted here.

For any signal or voltage, the relationship between high level and low level thereof can be inverted from that described above, without impairing the spirit of the above description.

The types of channels of the field-effect transistors (FETs) described in each embodiment are merely examples. The structure of the circuit including FETs can be modified in such a manner that the N-channel type FET is replaced by the P-channel type FET, or the P-channel type FET is replaced by the N-channel type FET.

As long as no contradiction arises, any transistor described above may be any type of transistor. For instance, any transistor described above as a MOSFET may be replaced by a junction type FET, an insulated gate bipolar transistor (IGBT), or a bipolar transistor, as long as no contradiction arises. Any transistor has a first electrode, a second electrode, and a control electrode. In an FET, one of the first and second electrodes is a drain, and the other is a source, and the control electrode is a gate. In an IGBT, one of the first and second electrodes is a collector, and the other is an emitter, and the control electrode is a gate. In a bipolar transistor that does not belong to the IGBT, one of the first and second electrodes is a collector, and the other is an emitter, and the control electrode is a base.

The embodiment of the present disclosure can be appropriately and variously modified within the scope of the technical concept recited in the claims. The embodiment described above is merely an example of the embodiment of the present disclosure, and meanings of the technical terms of the present disclosure or the structural elements are not limited to those described in the above embodiment. The specific numerical values shown in the above description are merely examples, and they can be changed to various values as a matter of course.

ADDITIONAL NOTES

Additional notes are described below about the present disclosure in which the examples of specific structure are described in the above embodiment.

A semiconductor device (10; see FIG. 3) according to one aspect of the present disclosure includes a driving circuit (111) arranged to be capable of supplying a drive signal in an ultrasonic band to a piezoelectric element (20); a damping circuit (140) having a resistance load (141) and an inductive load (142); and a control circuit (130) arranged to be capable of controlling the driving circuit, so as to perform a reverberation reduction operation after stopping the supply of the drive signal to the piezoelectric element. In the reverberation reduction operation, the control circuit controls the driving circuit to supply the piezoelectric element with a damping signal having a phase different from that of the drive signal, and then enables the damping circuit to connect to the piezoelectric element (first structure).

By supplying the piezoelectric element with the damping signal having a phase different from that of the drive signal after stopping the supply of the drive signal to the piezoelectric element, reverberation of the piezoelectric element can be reduced. The damping signal is effective for reducing the reverberation in a range where the reverberation has a large amplitude (amplitude of the piezoelectric element due to the reverberation), but when the amplitude of the reverberation is getting lowered, the damping signal itself may cause a new reverberation. On the other hand, also by connecting the resistance load or the inductive load to the piezoelectric element after stopping the supply of the drive signal, the reverberation can be reduced due to absorption of kinetic energy of the piezoelectric element. Here, the resistance load or the inductive load has a relatively high effect of reducing the reverberation when the reverberation has a small amplitude. On the other hand, the effect of reducing the reverberation is relatively lowered if the reverberation has a large amplitude due to a voltage restriction of the circuit or the like. This knowledge is obtained by the inventor this time. By performing the above reverberation reduction operation based on this knowledge, the reverberation can be quickly reduced (i.e., the reverberation time can be reduced).

The semiconductor device according to the first structure may have the following structure. The semiconductor device further includes an adjustment driving circuit (170) arranged to be capable of supplying the piezoelectric element with a second drive signal in the ultrasonic band separately from the drive signal as a first drive signal. The control circuit is arranged to be capable of performing an adjustment operation using the adjustment driving circuit, before a normal detection operation including the supply of the first drive signal to the piezoelectric element. In the adjustment operation, the control circuit determines set physical quantity for an adjustment target based on a reverberation state of the piezoelectric element after supplying the second drive signal to the piezoelectric element. In the normal detection operation, the control circuit controls the adjustment target to have the set physical quantity, and the adjustment target includes at least one of a resistance value of the resistance load, an inductance value of the inductive load, and the phase of the damping signal (second structure).

In this way, the adjustment target can have the set physical quantity on which individual variation, ambient temperature, and the like of the piezoelectric element are reflected (set physical quantity appropriate for reducing the reverberation), and hence the reverberation can be quickly reduced.

The semiconductor device according to the second structure may have the following structure. The adjustment driving circuit is arranged to be capable of supplying the piezoelectric element with a second damping signal having a phase different from that of the second drive signal, separately from a first damping signal as the damping signal, and the adjustment operation includes an adjustment unit operation (see FIG. 15). In the adjustment unit operation, the control circuit supplies the second drive signal to the piezoelectric element, stops the supply of the second drive signal, controls the adjustment driving circuit to supply the second damping signal to the piezoelectric element, and then connects the damping circuit to the piezoelectric element. In the adjustment operation, the control circuit is capable of performing the adjustment unit operation a plurality of times while changing the adjustment target by a plurality of steps, and in each adjustment unit operation, the control circuit determines the set physical quantity based on the reverberation state of the piezoelectric element when the damping circuit is connected to the piezoelectric element (third structure).

The semiconductor device according to the third structure (see FIGS. 11 to 13) may have the following structure. The semiconductor device further include a reception circuit (120) arranged to be capable of receiving a signal in the ultrasonic band. The normal detection operation includes one or more of the detection unit operations. In each of the detection unit operations, the first drive signal is supplied to the piezoelectric element, and after stopping the supply of the first drive signal, the reverberation reduction operation is performed. In each adjustment unit operation of the adjustment operation, and in each detection unit operation of the normal detection operation, the control circuit detects a ringing time ($T_{R\_A}$, $T_{R\_B}$), which is time after the damping circuit is connected to the piezoelectric element until a voltage value proportional to amplitude of a received signal of the reception circuit becomes lower than a predetermined threshold value. In the adjustment operation, the control circuit obtains and keeps the ringing time ($T_{R\_HOLD}$) when the adjustment target has the set physical quantity. After starting the normal detection operation via the adjustment operation, if a relationship between the ringing time detected in the normal detection operation and the kept ringing time satisfies a predetermined restart condition (see S7 in FIG. 13), the control circuit is capable of starting the adjustment operation again (fourth structure).

In this way, after starting the normal detection operation, if the ringing time increases due to a variation of ambient temperature or the like, the adjustment operation can be performed again, and the adjustment target can be adjusted in accordance with current situation.

The semiconductor device according to the third or fourth structure may have the following structure. The control circuit is capable of performing the adjustment unit operation the plurality of times while changing the resistance value of the resistance load by the plurality of steps in the adjustment operation, determines a set resistance value ($R_{SET}$) for the resistance load based on the reverberation state of the piezoelectric element when the damping circuit is connected to the piezoelectric element in each adjustment unit operation, and controls the resistance load to have the set resistance value in the normal detection operation (fifth structure).

The semiconductor device according to any one of the third to fifth structure may have the following structure. The control circuit is capable of performing the adjustment unit operation the plurality of times while changing the inductance value of the inductive load by the plurality of steps in the adjustment operation, determines a set inductance value ($L_{SET}$) for the inductive load based on the reverberation state of the piezoelectric element when the damping circuit is connected to the piezoelectric element in each adjustment unit operation, and controls the inductive load to have the set inductance value in the normal detection operation (sixth structure).

The semiconductor device according to any one of the third to sixth structures may have the following structure. The control circuit is capable of performing the adjustment unit operation the plurality of times while changing a phase of the second damping signal viewed from the second drive signal by the plurality of steps in the adjustment operation, determines a set phase ($\varphi_{SET}$) for the first damping signal based on the reverberation state of the piezoelectric element when the damping circuit is connected to the piezoelectric element in each adjustment unit operation, and controls the first damping signal to have the set phase in the normal detection operation (seventh structure).

In the semiconductor device according to any one of the second to seventh structures, the second drive signal may have a smaller amplitude than the first drive signal (eighth structure).

If the drive signal having the same amplitude as the first drive signal is used to perform the adjustment operation, signal components of peripheral reflected waves may be mixed with the reverberation signal component, so that the adjustment cannot be performed properly. By using the second drive signal having a smaller amplitude than the first drive signal to perform the adjustment operation, the reflected waves in the adjustment operation can be sufficiently small, and hence good adjustment operation can be realized.

In the semiconductor device according to any one of the first to eighth structures, the resistance load and the inductive load may be connected in parallel in the damping circuit (ninth structure).

The semiconductor device according to any one of the first to ninth structures may have the following structure. The driving circuit includes a first half-bridge circuit to be connected to a first terminal of the piezoelectric element and a second half-bridge circuit to be connected to a second terminal of the piezoelectric element, so that a rectangular wave signal as the first drive signal can be applied between the first terminal and the second terminal of the piezoelectric element using the first half-bridge and the second half-bridge circuit (tenth structure).

An ultrasonic sensor according to one aspect of the present disclosure includes the semiconductor device according to any one of the first to tenth structures and a piezoelectric element connected to the semiconductor device (eleventh structure).

The invention claimed is:

1. A semiconductor device comprising:

a driving circuit arranged to be capable of supplying a drive signal in an ultrasonic band to a piezoelectric element;

a damping circuit having a resistance load and an inductive load;

a control circuit arranged to be capable of controlling the driving circuit, so as to perform a reverberation reduction operation after stopping a supply of the drive signal to the piezoelectric element, wherein in the reverberation reduction operation, the control circuit is configured to control the driving circuit to supply the piezoelectric element with a damping signal having a phase different from that of the drive signal, and to enable the damping circuit to connect to the piezoelectric element;

an adjustment driving circuit arranged to be capable of supplying the piezoelectric element with a second drive signal in the ultrasonic band separately from the drive signal as a first drive signal, wherein the control circuit is arranged to be capable of performing an adjustment operation using the adjustment driving circuit, before a normal detection operation including the supply of the first drive signal to the piezoelectric element, in the adjustment operation, the control circuit is configured to determine a set physical quantity for an adjustment target based on a reverberation state of the piezoelectric element after supplying the second drive signal to the piezoelectric element, in the normal detection operation, the control circuit is configured to control the adjustment target to have the set physical quantity, and the adjustment target includes at least one of a resistance value of the resistance load, an inductance value of the inductive load, and the phase of the damping signal, wherein the adjustment driving circuit is arranged to be capable of supplying the piezoelectric element with a second damping signal having a phase different from that of the second drive signal, separately from a first damping signal as the damping signal, the adjustment operation includes an adjustment unit operation, in the adjustment unit operation, the control circuit is configured to supply the second drive signal to the piezoelectric element, stop the supply of the second drive signal, control the adjustment driving circuit to supply the second damping signal to the piezoelectric element, and then connect the damping circuit to the piezoelectric element, and in the adjustment operation, the control circuit is capable of performing the adjustment unit operation a plurality of times while changing the adjustment target by a plurality of steps, and in each adjustment unit operation, the control circuit is configured to determine the set physical quantity based on the reverberation state of the piezoelectric element when the damping circuit is connected to the piezoelectric element.

2. The semiconductor device according to claim 1, further comprising a reception circuit arranged to be capable of receiving a signal in the ultrasonic band, wherein the normal detection operation includes one or more detection unit operations, in each of the detection unit operations, the first drive signal is supplied to the piezoelectric element, and after stopping the supply of the first drive signal, the reverberation reduction operation is performed, in each adjustment unit operation of the adjustment operation, and in each detection unit operation of the normal detection operation, the control circuit detects a ringing time, which is time after the damping circuit is connected to the piezoelectric element until a voltage value proportional to amplitude of a received signal of the reception circuit becomes lower than a predetermined threshold value, in the adjustment operation, the control circuit obtains and keeps the ringing time when the adjustment target has the set physical quantity, and after starting the normal detection operation via the adjustment operation, if a relationship between the ringing time detected in the normal detection operation and the kept ringing time satisfies a predetermined restart condition, the control circuit is capable of starting the adjustment operation again.

3. The semiconductor device according to claim 1, wherein the control circuit is capable of performing the adjustment unit operation the plurality of times while changing the resistance value of the resistance load by the plurality of steps in the adjustment operation, determines a set resistance value for the resistance load based on the reverberation state of the piezoelectric element when the damping circuit is connected to the piezoelectric element in each adjustment unit operation, and controls the resistance load to have the set resistance value in the normal detection operation.

4. The semiconductor device according to claim 1, wherein the control circuit is capable of performing the adjustment unit operation the plurality of times while changing the inductance value of the inductive load by the plurality of steps in the adjustment operation, determines a set inductance value for the inductive load based on the reverberation state of the piezoelectric element when the damping circuit is connected to the piezoelectric element in each adjustment unit operation, and controls the inductive load to have the set inductance value in the normal detection operation.

5. The semiconductor device according to claim 1, wherein the control circuit is capable of performing the adjustment unit operation the plurality of times while changing a phase of the second damping signal viewed from the second drive signal by the plurality of steps in the adjustment operation, determines a set phase for the first damping signal based on the reverberation state of the piezoelectric element when the damping circuit is connected to the piezoelectric element in each adjustment unit operation, and controls the first damping signal to have the set phase in the normal detection operation.

6. The semiconductor device according to claim 1, wherein the second drive signal has a smaller amplitude than the first drive signal.

7. The semiconductor device according to claim 1, wherein the resistance load and the inductive load is connected in parallel in the damping circuit.

8. An ultrasonic sensor comprising:

the semiconductor device according to claim 1; and a piezoelectric element connected to the semiconductor device.

* * * * *